Aug. 12, 1941.  C. J. GOODALE  2,251,998
ACCOUNTING MACHINE
Filed March 13, 1937  14 Sheets-Sheet 1
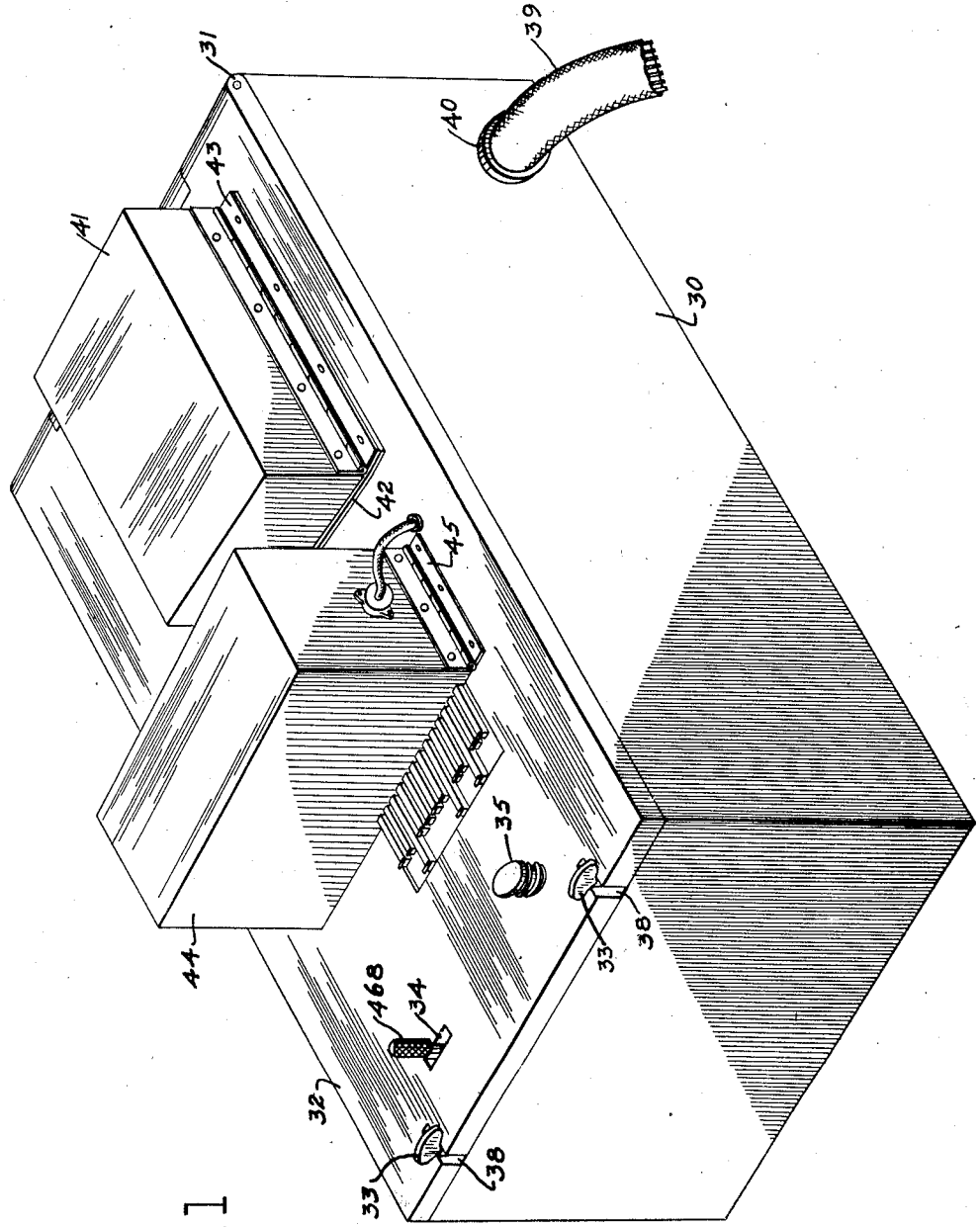
INVENTOR
Charles J. Goodale.
BY
ATTORNEY Aug. 12, 1941.    C. J. GOODALE    2,251,998
ACCOUNTING MACHINE
Filed March 13, 1937    14 Sheets-Sheet 2

INVENTOR
Charles J. Goodale.
BY John J. Shively
ATTORNEY

Aug. 12, 1941.  C. J. GOODALE  2,251,998
ACCOUNTING MACHINE
Filed March 13, 1937    14 Sheets-Sheet 3
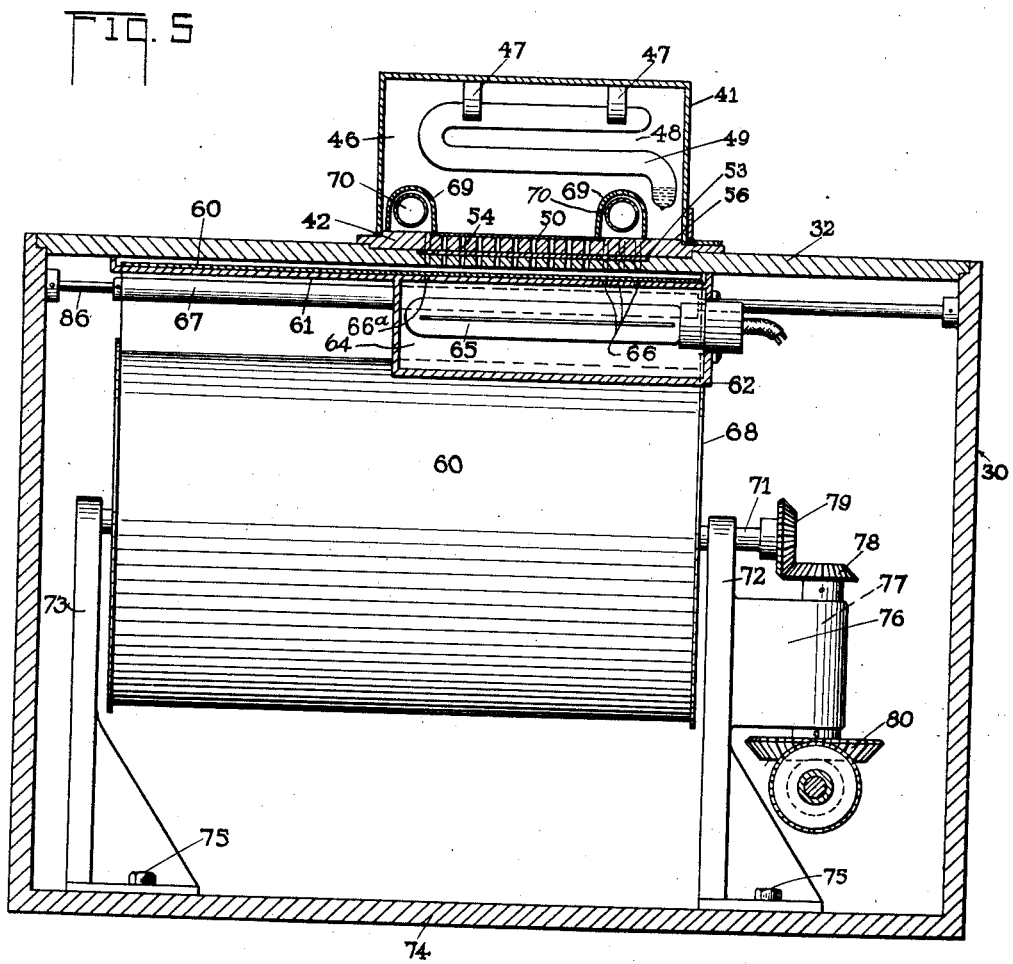
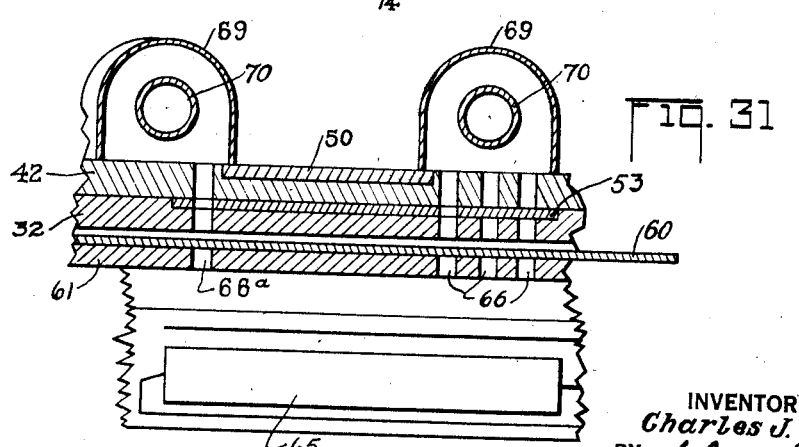
INVENTOR
Charles J. Goodale.
BY
John J. Shirely
ATTORNEY Aug. 12, 1941.　　　C. J. GOODALE　　　2,251,998
ACCOUNTING MACHINE
Filed March 13, 1937　　　14 Sheets-Sheet 4
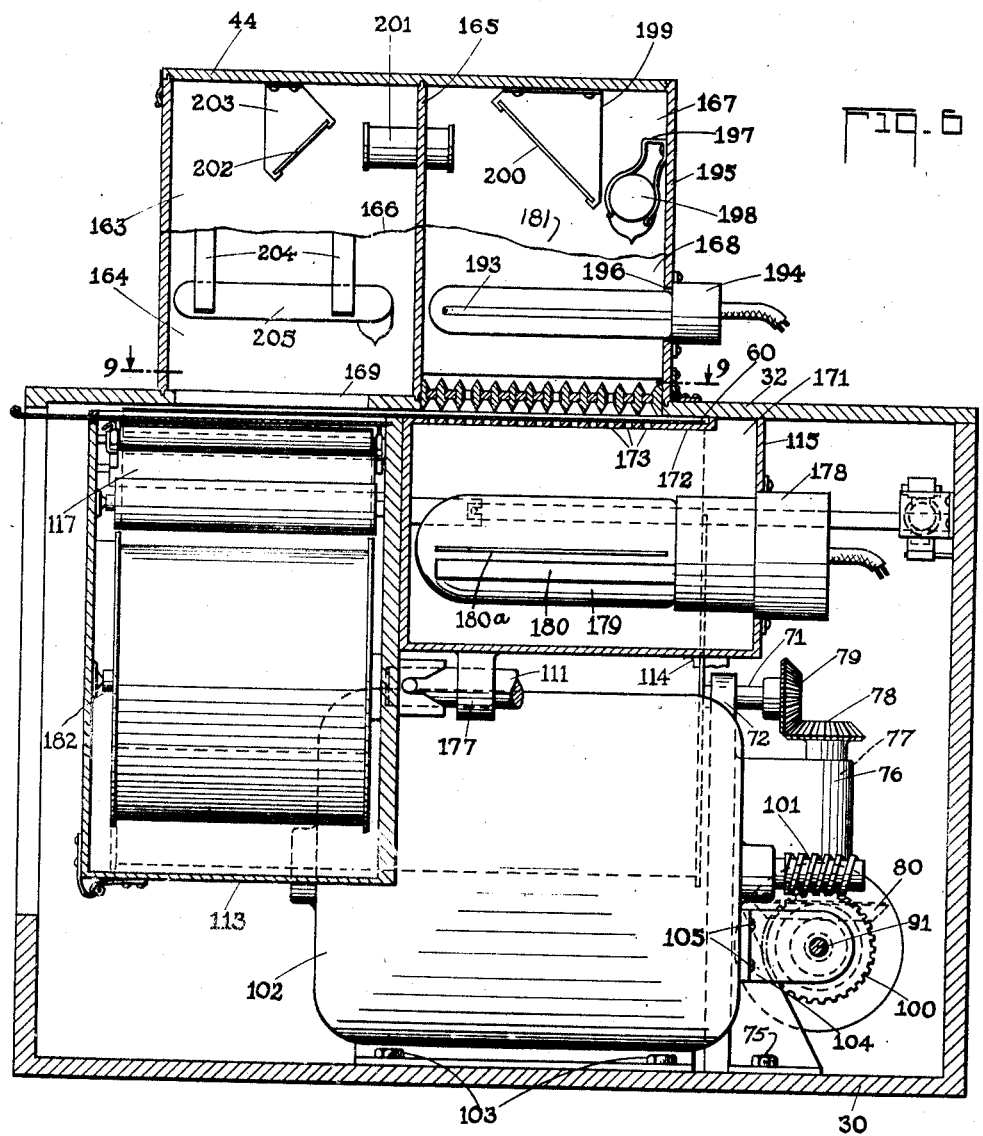
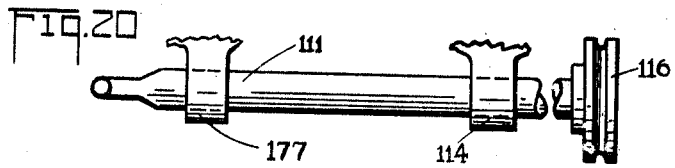
INVENTOR
Charles J. Goodale,
BY John J. Schweh
ATTORNEY Aug. 12, 1941.    C. J. GOODALE    2,251,998
ACCOUNTING MACHINE
Filed March 13, 1937    14 Sheets-Sheet 5
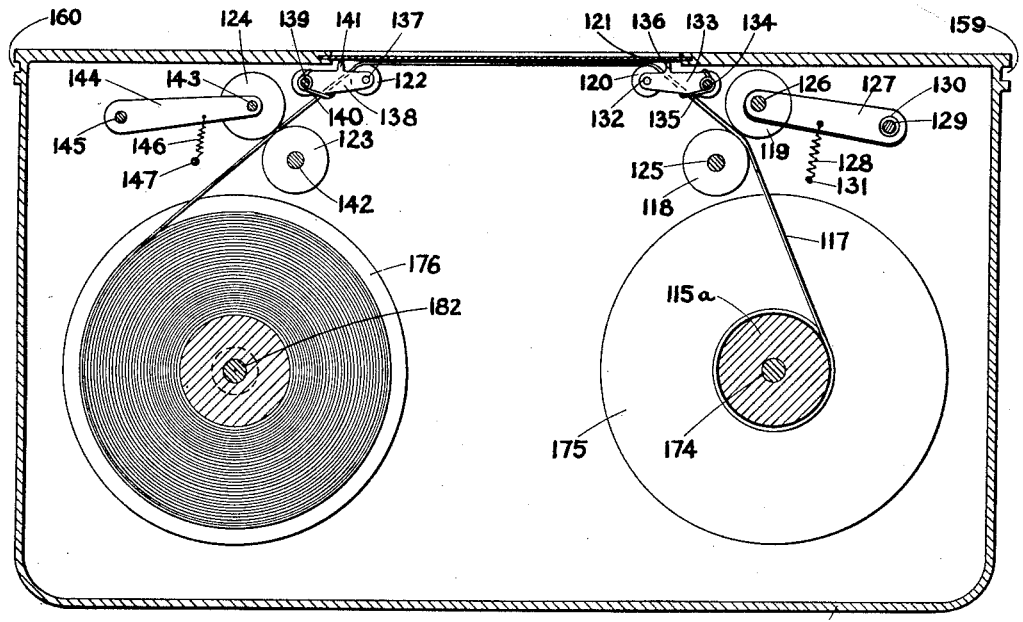
Fig. 7
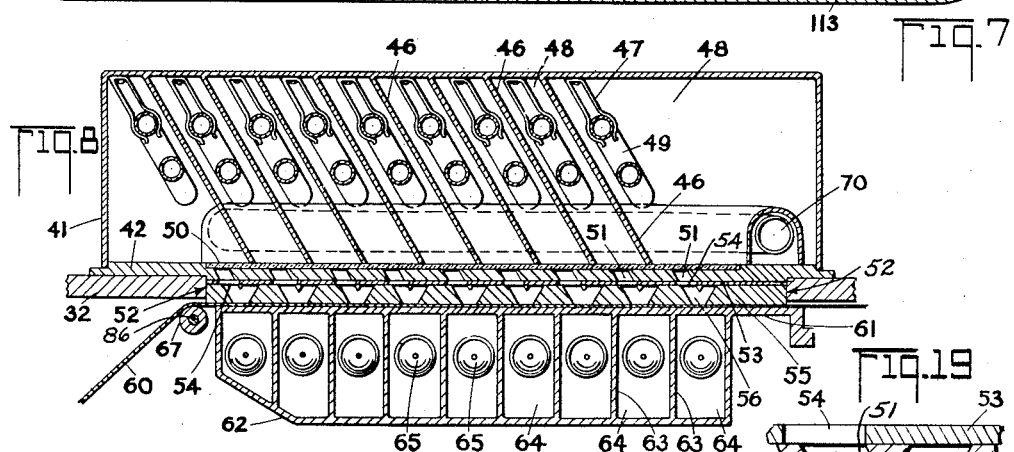
Fig. 8
Fig. 19
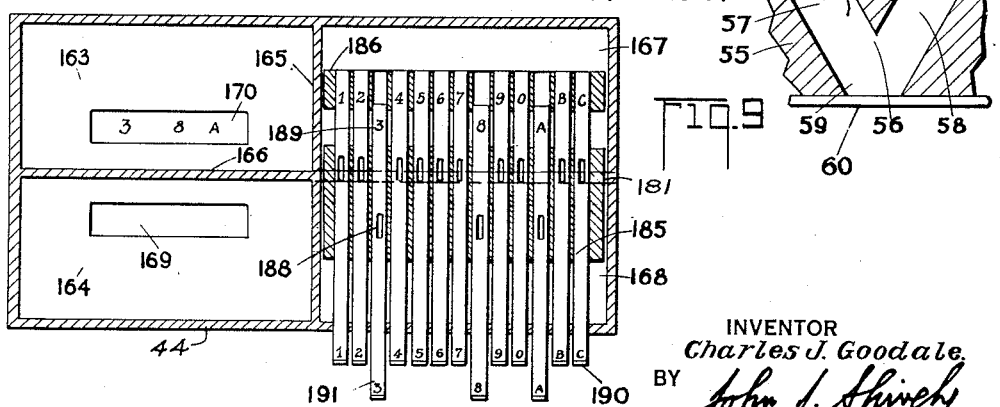
Fig. 9
INVENTOR
Charles J. Goodale,
BY
John J. Shively
ATTORNEY

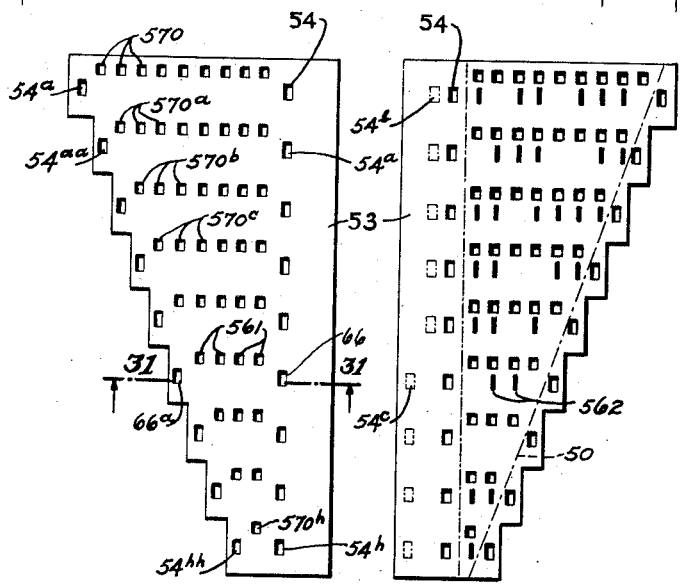
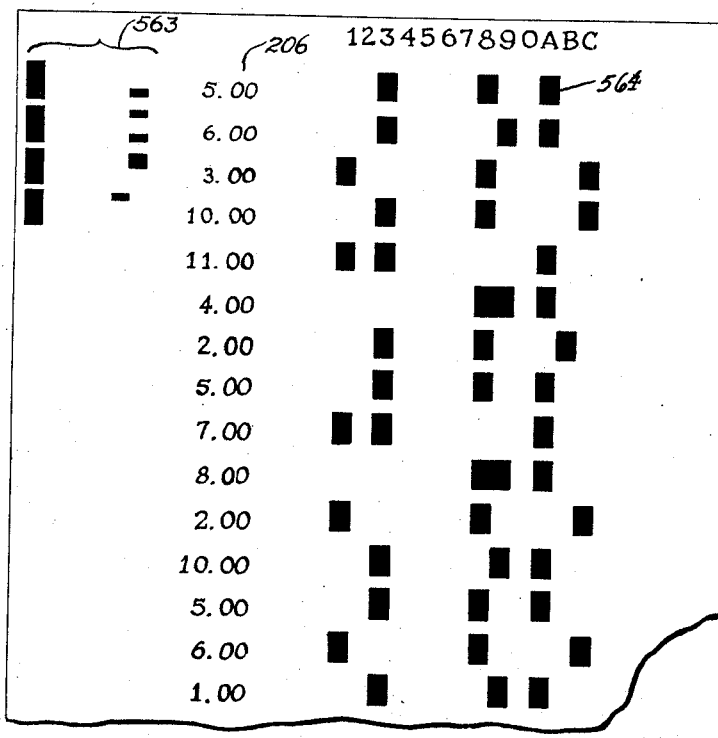

INVENTOR
Charles J. Goodale.
BY
ATTORNEY

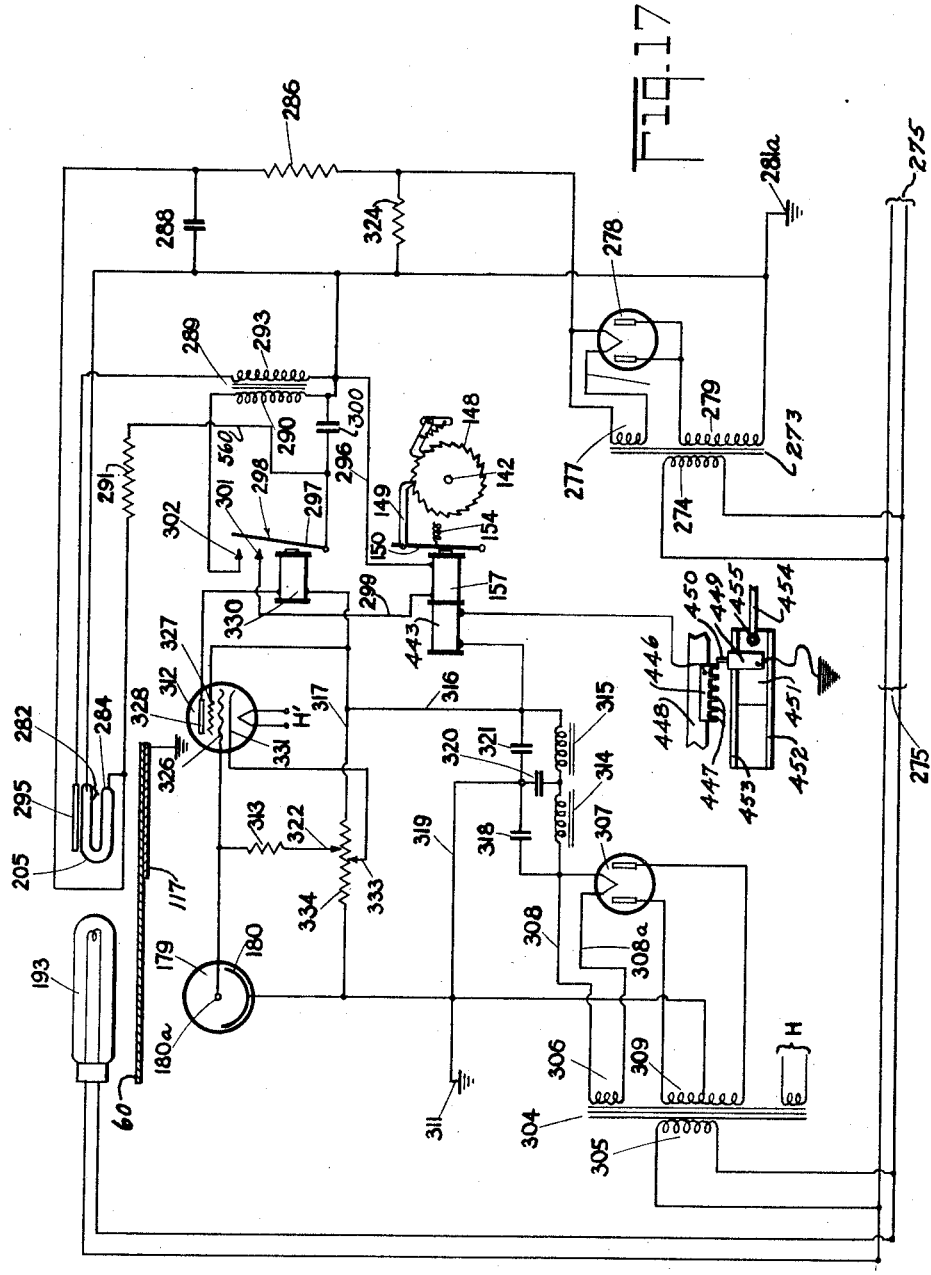

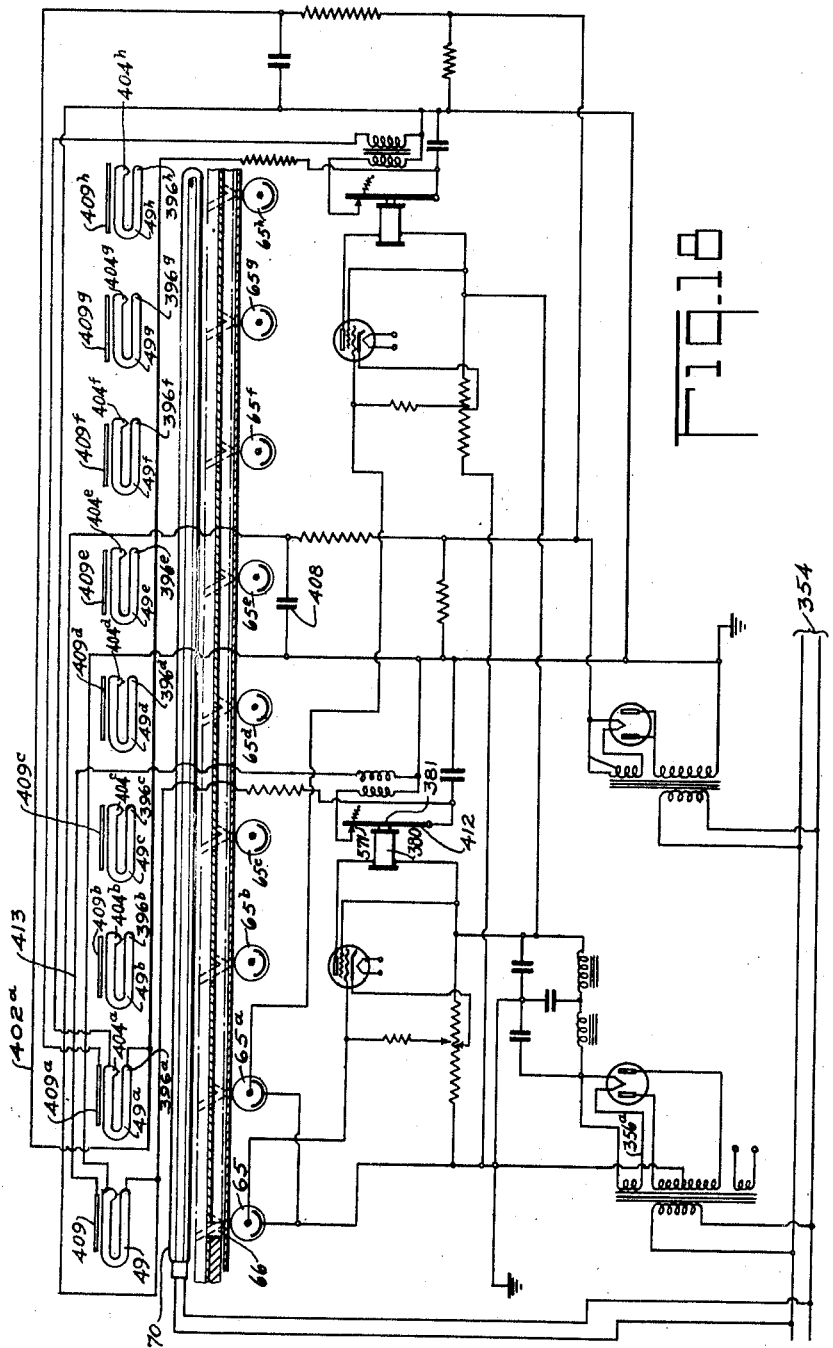

Aug. 12, 1941.　　　C. J. GOODALE　　　2,251,998
ACCOUNTING MACHINE
Filed March 13, 1937　　　14 Sheets-Sheet 11

INVENTOR
Charles J. Goodale.
BY John L. Shrick.
ATTORNEY

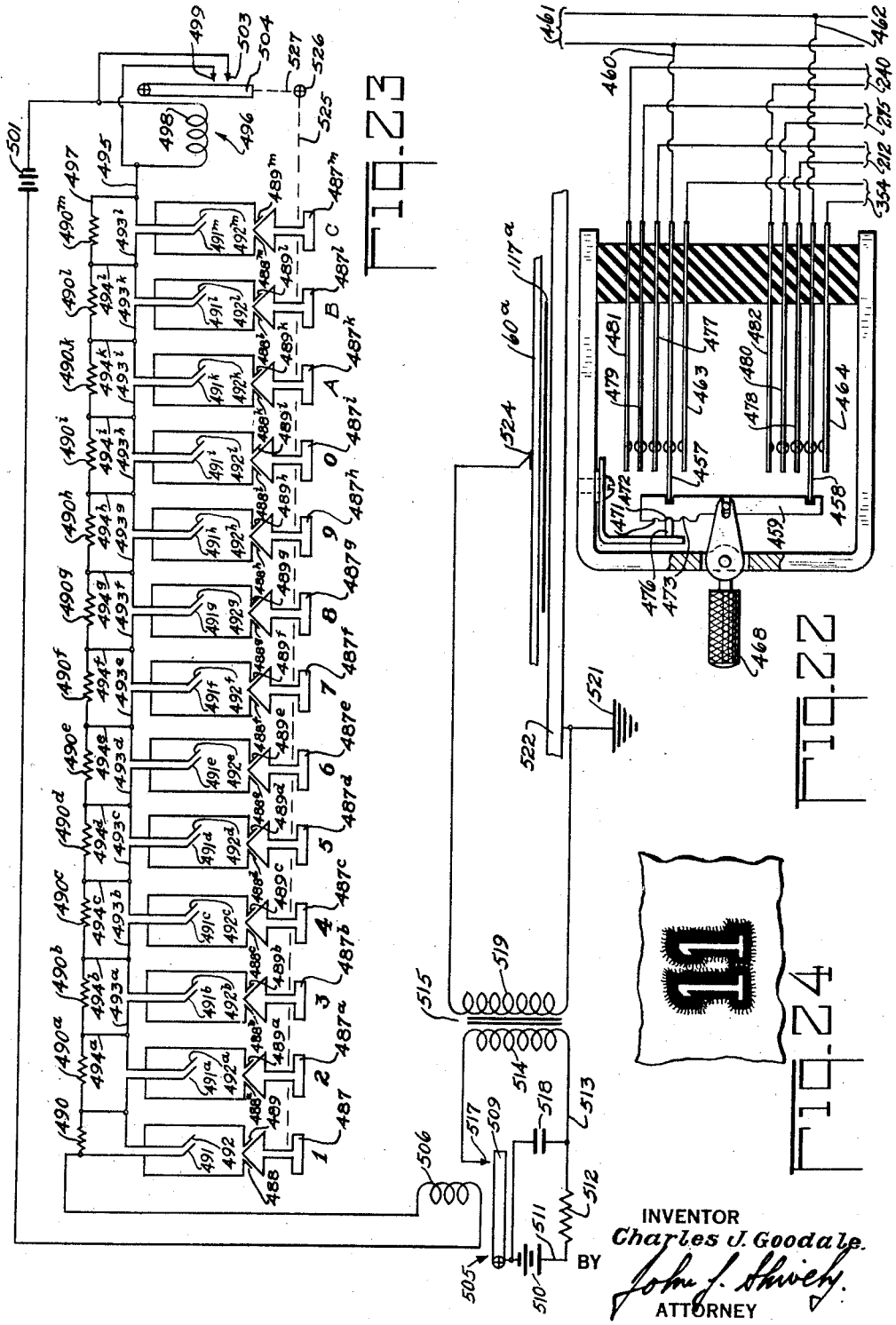

Aug. 12, 1941.  C. J. GOODALE  2,251,998
ACCOUNTING MACHINE
Filed March 13, 1937   14 Sheets-Sheet 13

INVENTOR
Charles J. Goodale.
BY
John J. Shively
ATTORNEY

Aug. 12, 1941.  C. J. GOODALE  2,251,998
ACCOUNTING MACHINE
Filed March 13, 1937  14 Sheets-Sheet 14

INVENTOR
Charles J. Goodale.
BY
ATTORNEY

Patented Aug. 12, 1941

2,251,998

UNITED STATES PATENT OFFICE 2,251,998

ACCOUNTING MACHINE

Charles J. Goodale, North Easton, Mass.

Application March 13, 1937, Serial No. 130,664

15 Claims. (Cl. 234—1.5)

This invention relates to improvements in accounting machines, and has for an object the provision of improved apparatus whereby item entries, facts, details or representations of a desired or specific classification or classifications may be selected from mediums carrying item entries of various classifications or groupings arranged in any order on a plurality of mediums or on a single medium, whereby replicas or representations of said entries, etc., falling in a certain classification or classifications may be recorded in any order desired on an individual vehicle or a plurality of vehicles. The recorded replicas are assembled or grouped on said separate or collective vehicle, each entry dealt with being confined to one specific classification or a plurality of specific classifications.

Another object of the invention is the provision of means for indicating and making known the various kinds and types of classifications, facts, objects, items, characters, symbols, or designations, or things desired, contained in a general assembly of items or groups of things, whereby it may be determined whether or not there are any items, facts, or objects of certain desired classifications or groupings included in said assembly, and may further be determined the classifications and groupings included in said assembly, and the number of necessary steps to be taken in preparing a list of items, facts and objects of certain predetermined or desired classifications.

A further object of the invention is the provision of means for recording from a general assembly of items, characters, symbols, or designations of various classifications collectively on a suitable medium those items, characters, symbols, or designations which fall in a predetermined group and at the same time recording on the same medium, or on a medium moved in time therewith, sub-classifications of said specific classifications.

Another object of the invention is the provision of apparatus for preparing a selected list of items, facts and objects of the kind and type of classifications and groupings desired, utilizing a general assembly of items, facts, objects, and representations falling in a plurality of classifications or groupings without affecting said general assembly or groupings and without recording items, facts and objects other than those falling in the desired classification or group.

A further object of the invention is the provision of apparatus for producing an image of the part or portion of the item, character, symbol or designation desired.

Another object of the invention is the provision of recording means adapted to reproduce under control of the images of the items, facts, characters symbols or designations falling in any desired classification, said recorder including a source of radiant energy, and a detector or receiver of radiant energy under control of certain specific classifications carried on mediums comprised of a single or a general assembly of items, facts and objects falling in various classifications; radiation from said source of radiant energy being effected when certain specific classifications appearing in certain positions in said medium affect said detector.

A still further object of the invention is the provision of means for determining before selections are made, the various kinds and types of classifications appearing in a general assembly of items, facts and objects by producing images or other representations of said classifications upon a suitable medium.

Another object of the invention is the provision of apparatus for imprinting or placing symbols, characters, objects and figures with material having conductive absorptive or reflective properties on a medium or mediums suitable for carrying items, facts and objects.

A further object of the invention is the provision of apparatus adapted to advance a carrier therethrough between two reels, and the provision of means cooperating with the carrier near either end thereof to stop the apparatus from moving and to position certain portions of the apparatus so that the latter will run in an opposite direction when it is again started into operation.

Another object of the invention is the provision of means for indicating the various types of classifications contained in a general assembly of items, whereby the operator may determine whether or not any items of a desired classification or classifications are included in said assembly, and may further determine the number of steps to take in preparing a list of items of certain predetermined or desired classifications.

Still another object of the invention is the provision of apparatus for preparing a selected list of a desired classification, or desired classifications, utilizing a general assembly of items falling in a plurality of classifications without affecting said general assembly and without recording items other than those falling in the desired classification or classifications.

Another object of the invention is the provision of apparatus for carrying out the new and improved method wherein means are provided for recording the images of the items of predetermined classification or classifications as and when they appear on a collective sheet in the form of a general assembly of various classifications.

Another object of the invention is the provision of a photographic recorder including a source of radiant energy having associated therewith photo-electric means under control of a record, comprising a general assembly of items falling in a plurality of classifications, the radiant energy being controlled by the symbols, or the like, representing the classification, and adapted when the latter are interposed between said photo-electric means and a source for exciting said means to effect control of said radiant energy.

A still further object of the invention is the provision of means to determine by photo-sensitive means the various classifications contained in a general assembly of items on a collective sheet prior to the collection therefrom of items of a specific classification or classifications, which include as a control means the reflection on to a photo-sensitive medium of light from the representations comprising the classifications.

Other objects and advantages of the invention will be apparent to those skilled in the art by a perusal of the following description in connection with the accompanying drawings, in which—

Figure 1 is a perspective view of one form of the apparatus capable of carrying out the new and improved method;

Figure 5 is an enlarged cross sectional view taken along the line 5—5 of Figure 2;

Figure 6 is a cross sectional view taken along the line 6—6 of Figure 2;

Figure 7 is an enlarged longitudinal view of the film magazine shown in section;

Figure 8 is a longitudinal detail of the classification listing means;

Figure 9 is a view showing the details of the masking means;

Figure 10 is a view of a portion of a collective sheet carrying item-entry units, each comprising numerical elements, and descriptive interpretative elements representing classifications;

Figure 11 is a view of a preferred form of film blank for preliminarily listing the classifications appearing in a record or a collective sheet such as shown in Figure 10;

Figure 12 is a view of the reverse side of a record such as shown in Figure 11, upon which the listing symbols have been photographically recorded;

Figure 17 is a circuit diagram of the controls for the film-advancing and item-photographing means;

Figure 18 is a diagram showing the electrical connections of the controls for the classification listing means;

Figure 19 is an enlarged view of one of the Y-slots such as shown in Figures 2 and 8;

Figure 20 is a detail view of a shaft for driving the take-up reel of the mechanism shown in Figure 7;

Figure 22 is a diagrammatic representation of a switch for controlling the circuits shown in Figures 15, 16, 17 and 18;

Figure 23 is a circuit diagram representing another embodiment of the invention which contemplates utilizing the "Lichtendraht" effect for recording;

Figure 24 is a fragmentary view of a portion of a record upon which is the product of the arrangement shown in Figure 23;

Figure 31 is an enlarged sectional view of a portion of Figure 5, of the classification perforations, taken along the line 31—31 of the film shown in Figure 11, while the latter is in operative position in the device;

Figure 3:
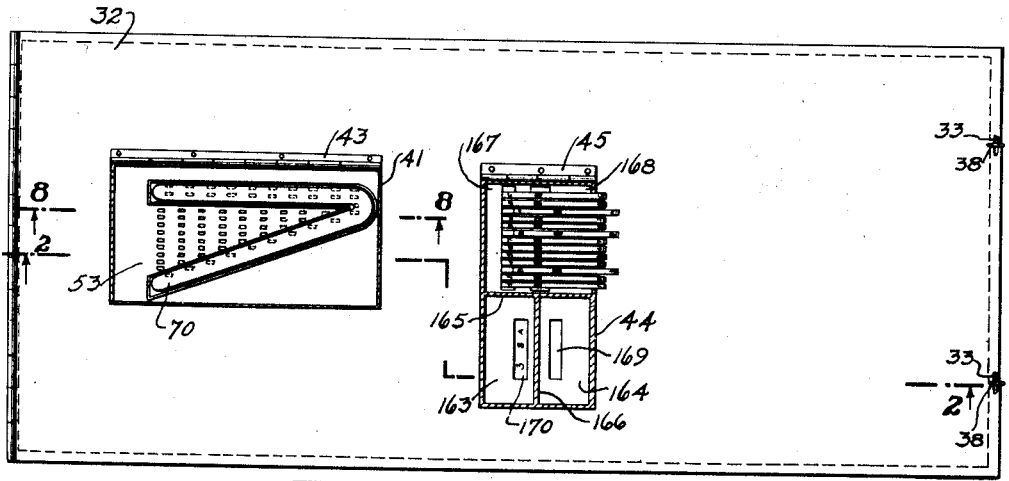
Figure 3 is a plan view of the apparatus with certain parts removed to show the masking means and a portion of the means for recording the classifications contained in a given record.

Fundamentally, the new and improved method consists in:

First: Assigning to each classification or classifications a particular arrangement or combination of symbols hereinafter referred to as "descriptive elements."

Second: Recording on a collective sheet or record all numerical elements regardless of order or classification (usually in the order obtained) from which a selection of all items in one specific classification, or a plurality of specific classifications are to be obtained, the descriptive elements indicating the classification of each item being recorded in a predetermined position on the record or carrier with respect to its numerical element.

Third: Making a photographic record of the different classifications appearing on said record or collective sheet.

Fourth: Selecting from the record or collective sheet and recording on another medium, photographic images of the numerical elements and/or descriptive elements falling in the desired classification under control of the descriptive elements.

The "Fourth" step of the method may be carried out in a device hereinafter referred to as a "selective analysis machine," one preferred form of which is shown in Figure 1.

The item entry units are classified, sorted and assembled by what is called the "principle of position" method—by putting the component parts of each item entry unit in certain particular positions on the medium that is used for receiving them.

The "component parts" of an item entry unit are herein known as the "descriptive-interpretive" elements and the "numerical" elements.

There is assigned to each kind and type of classification, separate and distinct positions in which the "descriptive-interpretive" parts of the item entry units are to be put, in relation to the "numerical" elements.

As a consequence, each item entry unit is arranged, placed, and disclosed, in a specially designated manner and order. Those that fall under a like kind and type of classification heading, have their symbol characters shown in the same relative positions one to another, on the medium used for receiving the item entry units.

As my apparatus automatically sorts the item entry units, it is only necessary, to bring together the item entry units that are shown in the specified positions assigned to any one particular kind and type of classification, in order to get the information about that particular classification.

It is the positions in which the "descriptive-interpretive" elements and parts are placed and located, in relation to the "numerical" elements or some other specified things, on the medium used for receiving the item entry units that identifies and denotes the kind and type of classification of the item entry unit.

In most instances the difference in the classification of one item entry unit from another is shown by the difference in the positions of the spots, or other designations, which define them.

However, there are occasions when the positions of the "numerical" elements also are varied. This naturally changes the relative positions the different elements will have one to another, and, is a factor which is used as an additional means of identifying the various kinds and types of classifications.

The selectivity of the item entry units for assembling is accomplished:

A. By establishing a variation in the transmission characteristics of any suitable medium upon which the aforementioned characters, symbols, figures, items and objects may be printed or placed.

B. By placement of the representations upon the record medium to represent certain items, magnitudes or combinations thereof.

C. By masking the medium, either positively or negatively, to select any discrete combination of item entries, separate particulars, facts, details or objects.

D. By the motion of medium relative to mask (movement of mask or paper).

Two types of masking may be employed, for example:

(a) Masking out certain space positions.

(b) Masking out all space positions with the exception of the ones representing the kind and type of classification to be handled.

The term "masking out" does not necessarily mean that its function is to prevent the transmission of energy; instead, it is meant to "impede the transmission of energy."

The phenomenon known as "photography" is produced by the action of light on certain substances, materials, or compounds. It is also true that in photography, light which cannot be seen by the human eye will affect certain types of photographic emulsions. It must be distinctly understood that this invention contemplates the use of light, both visible and invisible, and my device is operative when by utilizing electro-magnetic wave radiation as well as the spectrum extending beyond, both above and below the visible or optical spectrum, and is, therefore, not limited to the use of the visible wave lengths of light or any specific band of frequencies or wave lengths.

For convenience in illustrating and describing the invention, one embodiment utilizing the portion of the spectrum termed "light" is herein illustrated and described, and the terms "photography," "recording" and "printing" will be used to illustrate the phenomenon of producing or reproducing images on a suitable medium such, for example, as a film or photo-sensitive medium.

Another example of the use of the new and improved method is described which employs in part the principle known as the "Lichtendraht" effect.

In the specification in connection with both embodiments, the description will be confined to certain specific acts centering around the act of producing or reproducing images in accordance with my new and improved method. It must be understood that both of these embodiments are illustrative of means for carrying out my new and improved method, and that the procedure is not limited to the specific apparatus shown and described.

A main casing 30 (Figure 1) has hinged thereto at 31 a top plate 32 which forms a support for elements which will presently be described. The top plate 32 is normally held firmly in closed position on the casing 30 by means of clasps 33 which pass through slots 38 formed in the top plate 32. The top plate 32 has formed therein a slot 34 through which the knob 468 extends. The knob 468 forms an integral part of the switch mechanism illustrated in Figure 22. The operation of this switch in controlling the circuits in the new and improved system will be described in connection with Figure 22, and a push-button 35 is mounted in the top plate 32, and its function will presently be described in connection with Figure 16.

The present embodiment of the invention contemplates the provision of panel boards (not shown) mounted external to the casing 30. These panel boards will contain a large part of the apparatus indicated diagrammatically in Figures 15, 16, 17, and 18, and a suitable cable 39 is provided for interconnecting instrumentalities within the device shown in Figure 1 with these panel boards.

A casing 41, together with a closure plate 42, is pivotally mounted on the top plate 32 by means of a hinge 43. A rectangular casing 44 is pivotally mounted on the plate 32 by means of a hinge 45.

Figure 2:
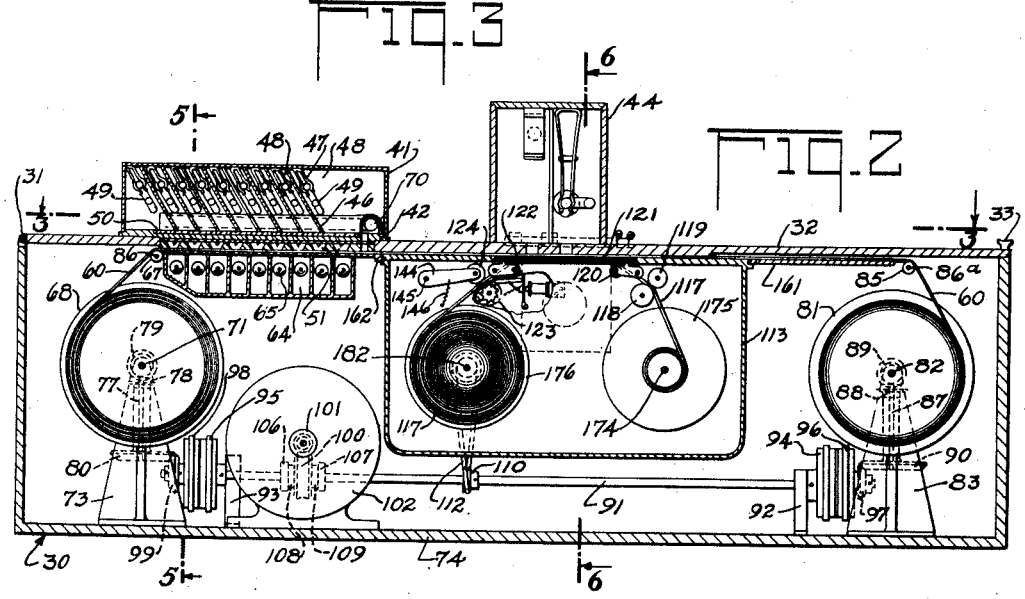
Figure 2 is a longitudinal sectional view of the apparatus shown in Figure 1.

Referring now to Figure 2, in which the casing 41 is shown in section, it will be seen that the casing 41, together with its closure plate 42 forms a light tight chamber which is divided into a plurality of light tight compartments by means of diagonal partitions, one of which is designated by the numeral 46.

A plurality of spring clips 47 are supported within the casing 41, said clips being arranged in pairs, as shown in Figures 5 and 8, one pair being mounted in each compartment 48 and forming a support for a mercury tube 49. In the embodiment shown in Figure 2, the diagonal partitions break the interior of the casing up into nine compartments, each containing a mercury tube 49. The method of controlling the illumination of the tubes 49 will be described in connection with the circuit diagram, Figure 18. The closure plate 42 has a filter 50 set in flush with the outer surface thereof. The closure plate 42 within the area beneath the filter 50, has formed therein a series of diagonal slots 51.

The top plate 32 has formed therein an opening 52 which may be of any desired shape; however, it has been found preferable to form this opening of such shape that a film 53 may be accurately located therein with its perforations, one of which is designated by the numeral 54, in line with the diagonal slots 51. The shape of this film is clearly shown in Figures 11 and 12. The opening 52 has positioned therein a plate 55 which may be of the same shape as the film 53, the outline of which is shown in Figures 11 and 12. The plate 55 is positioned in the hole 52 in fixed relation to the plate 32 and forms a bottoming plate upon which the film 53 may rest. The plate 55 has formed therein a series of Y slots 56 (Figures 2 and 8), one of which is shown in an enlarged section in Figure 19.

Referring to this Figure 19, the upper left leg 57 of the Y communicates with the perforation 54 in the film 53; the upper right leg 58 communicates with the under-surface of the film in the area between the perforations, and in which the bottom leg 59 of the Y communicates with the record 60.

The record 60 passes between the plate 55 and the upper surface 61 of a light sensitive cell casing, generally designated by the numeral 62 (Figures 5, 8 and 31), and divided by means of partitions 63 into a series of compartments 64 each containing a light sensitive cell 65. The upper surface 61 of the compartments 64 has formed therein a series of holes or perforations 66, 66ª, which permit the mercury tubes 49 to be controlled in accordance with the designations or classifications in the record 60.

The cells 65 are so positioned relative to the holes or perforations 66, 66ª, that light from the lamp 70 may impinge upon the active elements of the cells under certain conditions which will hereinafter be explained. A roller 67 is pivotally mounted adjacent to the left end of the casing 62 with its upper edge in tangental line with the upper surface 61, as shown in Figure 8. This roller may also be seen in Figure 2, and the record 60 passing thereover is guided onto the reel 68.

The lamp or source of illumination 70 is preferably in the form of a V with one vertical leg positioned within the casing 41 adjacent to the upper surface of the closure plate 42, and is so positioned relative to the film 53 that the straight leg spans the alphabetical perforations designated by the letters A, B, and C; see Figure 3 for the position of the lamp 70 relative to the film, Figure 12 for the positions of the perforations designated A, B, C, and Figure 31 for a sectional view showing the position of the lamp 70 relative to the perforations 66, 66ª, and the active elements of the photo-electric cells 65.

In Figure 31, it will be noted that the film 53 is shown in operative position, and has perforations in line with the perforations 66 along one side thereof; and has perforations in line with the left hand perforation 66ª. This will effect the selection of classifications which include symbols in the A column of the record. By referring to Figure 31, it may be seen that where a dark spot appears on the record 60 to prevent light from emerging via a given perforation 66, and a spot on the record falling in line with a corresponding perforation 66ª will completely block off the light, preventing the same from reaching the cell 65. This will cause the tube 49 associated with the row to be controlled by the perforations 66 and 66ª to be illuminated. The section shown in Figure 31 was taken along line 31—31 of Figure 11. The perforations 66 and 66ª are indicated along this section line in Figure 11, and if any classifications occur in the record beneath the group of perforations bracketed and designated by the numeral 561, they will reflect light from the mercury lamp 49 associated with this particular row of perforations, which reflected light will in turn affect the record in areas immediately adjacent to the perforations. For example, two such recordings are indicated in Figure 12 by the bracket designated by the numeral 562.

The classifications on the records hereinafter referred to as "black rectangles," "circles" or "squares" may be taken to mean characters, symbols or figures having any desired fashion or shape, and such symbols do not necessarily have to be "black." It must be distinctly understood that such rectangles, squares, circles, or characters may be of any color and may be used in connection with filters or may contain chemicals having peculiar absorbing and reflecting qualities as well as the qualities of being converted into other radiations of other wave lengths in part or as a whole and may be placed upon the record so as to be visible or invisible.

A filter 50 is utilized to permit light of a specific band to pass through the perforations to be reflected on to the film 53 in which case the classification elements or designations would be of a material and color capable of reflecting efficiently the light passed by the filter. The record 60 would be of such color that it would at least partially absorb the light passed by the filter. Any type of filter may be used, the main idea being to have the records upon which the items, facts, characters, symbols, designations or objects are carried of such color that the wave length sensations which the filter transmits are at least partially absent in the vehicle.

The selection or elimination of any desired portion of the frequency spectrum may be effected by a filter arrangement.

The term "filter," as above described, means a medium whose transmission characteristics are such that it is conductive over a fixed and predetermined band of frequencies and is substantially non-conductive at all other frequencies. "Light" filters are used above and below, as well as within the visible or optical frequency range and electric wave filters are used in the range of electrical frequencies.

Thus in the section of the apparatus shown herewith for indicating the type and kind of classifications appearing on a given vehicle, and for convenience in illustrating the method, an example of a filter arrangement falling in the optical range is described in which a filter whose transmission characteristics fall within a specific range is described. This filter is, therefore, non-conductive of radiation above or below certain frequencies. Assuming a filter is used which cuts off the frequencies above a wave length of approximately 5000 A. U. and below a wave length of approximately 4000 A. U. then the radiation of wave lengths which fall between these two points is the only radiation that will be transmitted by the filter, all others will be eliminated. Such a filter may be referred to as a "blue filter," or one which transmits only "blue" light, and absorbs all radiation from the "source of radiant energy" with the exception of the wave lengths that give the sensation of a "blue" color.

It is, therefore, apparent that the only wave lengths that pass through the filter are the "blue" sensation wave lengths. If the medium bearing facts, items, characters, symbols, objects or designations is one from which the "blue" sensation wave lengths are at least partially missing, and although it may contain many other sensation wave lengths, the "blue" sensation wave lengths will not show up on it, and of course such medium will be unable to transmit or reflect any "blue" sensation wave lengths due to the fact that they are not present.

It is well known that "light" contains all color sensation wave lengths both visible and invisible, and when "light" is thrown on any object it is in part or as a whole absorbed, transmitted or reflected by the object upon which it falls. The color sensations which can be seen are those parts of the visible wave lengths which have not been absorbed (which have been reflected). However, in order to reflect, the object must first be of a material having such characteristics that it absorbs all the wave lengths except those which it reflects. However, it must have in its composition, characteristics which allow it to reflect certain wave lengths. For example, it may be said that the object reflects only the wave lengths which are included in its composition and which are not absorbed.

Now if an object from which the "blue" color sensation is missing, or its properties are such that it absorbs the "blue" color sensation, is placed in the section of the apparatus to receive only the "blue" sensation radiation coming, it is evident that because the object is itself lacking in the "blue" sensation it cannot reflect the "blue" sensation because there is no "blue" sensation present to reflect.

As an example and for illustrative purposes, it being understood that the invention does not specify or limit the method to the colors herein mentioned but intends that any wave lengths may be used, if a filter is used which transmits only "blue" sensation into the section and the vehicle or record is such that it gives a "yellow" sensation, and the ink with which the classifications are imprinted is "blue," then when any radiation, which can only have a "blue" sensation, contacts the vehicle, the imprinted characters (because they are "blue") will reflect the radiation onto the photo-sensitized vehicle, for example on to the under surface of the film 53.

Where such filtered light falls upon the positions on the record containing no classification characters, the record will at least partially absorb the radiation instead of reflecting it in full, therefore character images for those specific positions will not be recorded on the film. Therefore, only those positions which correspond with the positions which show character imprints on the record will appear on the photo-sensitized vehicle. In other words, these positions on the photo-sensitized vehicle show what classifications and groupings were active on the vehicle containing the items, facts and objects.

The slanting leg of the lamp 70 is positioned to supply illumination to the perforations 1, 2, 3, 4, 5, 6, 7, 8, 9, along the left edge of the film 53. A suitable light-tight shield 69 embraces the tube 70 and members up with the plate 42 and the filter 50 to prevent light from entering the perforations 54 which are positioned between the legs of the lamp 70. The partitions 46 have slots formed therein which fit in light-tight relation to shield 69, thereby preventing light from the lamp 70 from entering the compartments 48.

The record 60, which in preferred form, is comprised of a linear strip carrying the items and the symbols representing the various classifications. A portion of such a record is illustrated in Figure 10. The column of entry items is designated by the numeral 206. The characters, symbols, or representations of the various classifications are for purposes of illustration shown in the form of rectangles, one of which is designated by the numeral 564. These representations are in various positions, in accordance with what class or classification they represent. The columns containing these representations are numbered at the headings from 1 to 9, 0, and A, B and C. In some cases the classifications may also fall into sub-classifications and a plurality of items may have the same classification but different sub-classifications. Such sub-classifications are indicated adjacent to the left edge of the record, and designated by the numeral 563.

This record 60 may be handled on reels, one of which was above referred to and designated by the numeral 68. This reel is carried on a shaft 71, Figures 2, 5 and 6, which is journalled in pedestals 72 and 73, Figure 5. These pedestals are secured to the base 74 of the main casing 30 in any suitable manner, for example by means of cap screws 75. The pedestal 72 has formed integral therewith a boss 76 forming a bearing for a vertical shaft 77. A mitre gear 78 is secured to the upper end of the shaft 77, and a second mitre gear 79 meshes with the mitre gear 78 and is secured to the shaft 71 in driving relation. The lower end of the vertical shaft 77 has secured thereto in driving relation, a bevel gear 80.

Referring now to Figure 2, a second reel 81 also carries the record 60, the reel 68 serving as a supply reel, and the reel 81 as a take-up reel when the film is passing from left to right, as viewed in Figure 2. When the record is moving from right to left, the reel 68 serves as a take-up reel and reel 81 as the supply reel. The reel 81 is carried on a shaft 82 and is journalled in pedestals 83 and 84, similar to 72 and 73. A roller 85 is positioned adjacent to the top plate 32 and is spaced apart therefrom substantially the same distance as that of the roller 67; the roller 67 is pivotally mounted on shaft 86, and the roller 85 is pivotally mounted on the shaft 86ª. The pedestal 83 has a boss, similar to the boss 76, carrying a vertical shaft 87. Secured to the upper end thereof is a mitre gear 88 which meshes with a similar mitre gear 89 secured to the reel shaft 82. The lower end of the shaft 87 has secured thereto a beveled gear 90. A main drive shaft 91 is pivotally supported on the base 74 of the main casing by means of pedestals 92 and 93. The shaft 91 carries at its extreme ends magnetic clutches 94 and 95. The driven member 96 of the clutch 94 has secured thereto, in driving relation, a beveled pinion 97 which meshes with the beveled gear 90. The driven member 98 of the clutch 95 has secured thereto, in driving relation, a beveled pinion 99 which meshes with the beveled gear 80. The driven member of the magnetic clutch 94 can only be driven when the windings (not shown) of the clutch 94 are energized. Likewise, the driven member 98 cannot be driven until the winding of the clutch 95 is energized.

The shaft 91 has a worm gear 100 keyed thereto in driven relation to a worm 101 carried on the shaft of an electric motor 102. The motor is secured to the base 74 by means of cap screws 103, or in any other suitable manner. A yoke 104 is secured to the motor 102 by means of screws 105. The worm gear 100 is positioned between the arms 106 and 107 of the yoke 104, and thrust bearings 108 and 109 serve to take up any thrust in either direction. The shaft 91 also carries a grooved pulley 110, which is connected in driving relation to a shaft 111 by means of a wire belt 112.

The shaft 111 may be more clearly seen in Figures 6 and 20. It is journalled in bosses 177 and 114 which project downwardly from the bottom of the cell housing 115. A grooved pulley 116 is secured to the end of the shaft 111, and the wire belt 112 passes thereover. The belt serves to frictionally drive the pulley 116 and to momentarily move the shaft 111 in a manner to be presently described.

The shaft 111 is pivotally supported in a light-tight casing 113 which also has supported therein a shaft 174 spaced apart from the shaft 111. A reel 175 carrying a sensitized film is supported on the shaft 174, and a reel 176 supported on the shaft 182 serves as a take-up reel for the film, which is designated by the numeral 117. The sensitized film 117, as it leaves the reel 175, passes between rollers 118 and 119 and over a roller 120, and thence along the lower surface of a transparent panel 121 in the upper surface of the casing 113, Figures 2, 4 and 7. The film then passes over a roller 122 which is spaced apart from the roller 120. The film, leaving the roller 122, then passes between rollers 123, 124 and on to the take-up reel 176.

The roller 118 is pivotally mounted on the shaft 125. The roller 119 is pivotally supported on the shaft 126 carried by the yoke 127 insulatedly mounted on the stud 129, an insulating bushing 130 being positioned between the yoke 127 and the stud 129. A spring 128 has one end connected to the yoke 127, and the other connected to an insulating stud 131. The spring 128 urges the roller 119 toward the roller 118, and due to the fact that the stud 127 supporting the roller 119 is insulated, the film 117 as long as the supply lasts, will keep the rollers 119, 118, from coming in contact with each other. With this in view, the rollers 118 and 119 may be used to control a circuit for stopping the machine or giving a signal when the supply of film is exhausted.

The roller 120 is carried on a pivot pin 132 which is in turn supported in a yoke 133 pivotally mounted on the stud 134. A spring 135 urges the roller 120 toward the transparent window 121. An arm 136 formed integral with the yoke 133 prevents the roller 120 from touching the window 121.

The roller 122 is mounted and supported in the same manner as that of the roller 120, except that it is oppositely disposed, the pivot pin 137 being supported in a yoke 138 which in turn is pivotally mounted on the stud 139 which is urged toward the window 121 by a spring 140 and this movement is limited to an arm 141 formed integral with the yoke 138.

The roller 123 is secured to the shaft 142 which is pivotally mounted in the casing 113 and extends through the rear wall thereof as viewed in Figure 7. Other mechanism carried on this shaft outside of the casing will presently be described.

The roller 124 is pivotally mounted on the shaft 143 which is in turn carried by a yoke 144. The yoke 144 is pivotally mounted on the stud 145 supported by a wall of the casing 113. A spring 146 has one end thereof connected to the yoke 144 and the other end connected to the stud 147 and serves to urge the roller 124 toward the roller 123.

Figures 4, 32:
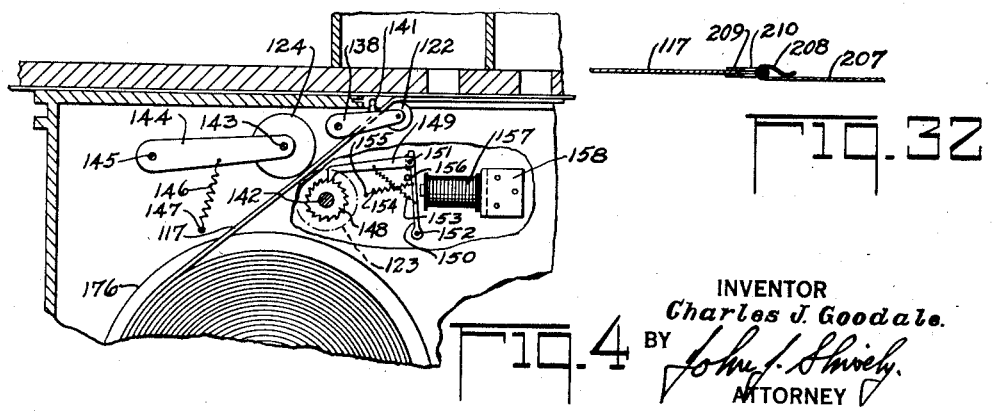
Figure 4 is an enlarged detail view of the record-advancing means and adjacent parts.
Figure 32 shows details of method of securing metallic strips to the record or film, for reversing the machine and stopping the motor respectively.

The shaft 142, referring now to Figure 4, has secured thereto in driving relation, a ratchet wheel 148. A pawl 149 is pivotally mounted on an armature 150 by means of a pivot pin 151 and the armature 150 is in turn pivotally supported on the shaft 152 which may be secured to the rear wall of the casing 113 or otherwise suitably mounted.

A spring 153 has one end secured to the pawl 149 and the other end secured to the armature 150, said ends being preferably secured at approximately the mid-points of the pawl and the armature. The function of the spring 153 is to maintain the pawl in engagement with the ratchet. A second spring 154 has one end secured to the armature 150 and the other end secured to a stud 155 suitably supported on said wall of the casing. The spring 154 tends to hold the armature against the stop pin 156.

An electro-magnet 157 is mounted in cooperative relation to the armature 150, for example, by means of a bracket 158 which may also be secured to said wall of the casing 113.

The casing 113 may be bodily removed from the top plate 32 and is provided with slides 159 and 160 which may respectively engage supporting members 161 and 162, and may be readily slid into position like a drawer with the window 121 registering with the recording mechanism about to be described.

Referring now to Figure 6, it will be noted that the casing 113 is in its normal position beneath the compartments 163 and 164. By referring to Figures 3 and 9, these compartments may also be seen. (Also Figure 21.)

These compartments are formed within the casing 44 by the wall 165 and by walls 166 and 181 disposed at right angles to the wall 165. These walls also form compartments 167 and 168, as viewed in Figure 6. The compartment 164 is in front of the compartment 163 and the upper portion of the dividing wall 166 is broken away so that the upper portion of the compartment 163 may be seen. Likewise, the compartment 168 is in front of the compartment 167, and due to the fact that the upper portion of the wall 181 is broken away, the upper portion of the compartment 167 may be seen.

The bottom wall of the compartment 164 has formed therein a window 169 and the bottom of the compartment 163 has formed therein a window 170. These windows are in line with each other in the direction in which the film 117 travels.

The main casing 30 has positioned therein a cell housing 115, the interior of which forms a light-tight compartment 171. A portion of one wall of this compartment designated by the numeral 172 is spaced apart from the top plate 32 to provide room and clearance for the record 60.

The wall 172 is provided with a plurality of perforations 173. A suitable socket 178 is mounted in the end wall of the cell housing 115 and a suitable light sensitive cell 179 is supported within the cell housing by the socket 178, the cathode 180 and the anode 180ª being in line with the perforations 173. The perforations 173 are in line with the window 169, as shown in Figure 6.

Figure 21:
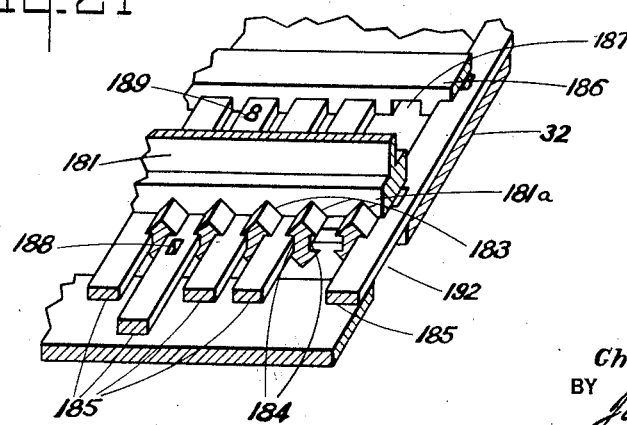
Figure 21 is a perspective view of the settable masks shown in Figure 9, and showing details of a portion of a dividing wall between compartments.

Referring to Figure 21, in which the construction of the bottom walls of the compartments 167 and 168 is detailed, it will be noted that the wall 181 has its lower end 181ª widened and provided with a series of parallel slotted projections 183, each having oppositely disposed notches 184 formed therein in line with each other so that notches facing each other in adjacent projections form slides. A slidable member 185 is mounted in each pair of facing notches. A bar 186 is positioned substantially parallel to and spaced apart from the wall 181 in the compartment 167, and is provided with a plurality of notches, one of which is shown as 187, one notch being provided for each of the slidable members 185.

Each slidable member 185 has a transverse hole 188 formed therein, and in the preferred embodiment the holes 188 may be of any shape— rectangular, round or square. Each member 185 is also provided with a symbol, character or numeral 189.

When the members 185 are in their normal positions, the holes 188 are positioned beneath the extension 181ª, and the numerals, characters or symbols 189 are positioned within the slots 187 in the bar 186 and are not visible. Each member 185 has an upturned end 190 which may be engaged by and moved by the operator's fingers. Each member is also provided with a like character, symbol or numeral 191 having the same value or significance as the character, symbol or numeral 189 above described. The character, symbol or numeral 191 is visible from the outside of the casing 44, so that they may be seen by the operator in making set-ups.

The top plate 32 may also be slotted to match the slots 187 and cut-away and notched to match the notches 184 in accordance with which it is found to be preferable. The top plate may also be cut away to form a window 192 which is light tight when all of the members 185 are in their normal position.

The spaces between the slotted projections 183 are in line with the perforations 173, above described in connection with the compartment 171 containing the light sensitive cell 179 so that whenever any member or members 185 are drawn forward, as shown in Figure 9, light may pass through the holes 188 from the lamp 193 in the compartment 168. A suitable socket 194 is secured to the wall 195 and forms a support for the lamp 193, said lamp extending through a hole 196 formed in the wall 195, Figure 6.

As above stated, light may fall upon the cell 179 after passing via holes 188 in those members 185 which have been drawn forward. This is predicated on what the record contains and will be presently described in detail.

Within the compartment 167 and mounted on the wall 195, is a suitable clip or holder 197 which serves to support a mercury tube 198. Although the mercury tube is shown and described it must be understood that any source of highly actinic light can be employed, and the mercury tube 198 is shown by way of illustration as an example of any form of highly actinic light.

Referring now to Figure 9, it is noted that three of the slidable members 185 are advanced and that their symbols, characters or numerals 189 have been moved from underneath the bar 186. Referring again to Figure 6, a mirror 200 is mounted near the top of the chamber 167, angular with respect to the bottom of the chamber 167 by a suitable bracket 199. So that when the mercury tube 198 illuminates the symbols, characters and numerals 189, the mirror 200 will project the images thereof via the lens 201 and a mirror 202 and the window 170 on to the film 117.

The lens 201 is mounted in the wall 165 between the compartments 167 and 163, and after having been properly focused, it may be fixed by suitable locking means, not shown. The mirror 202 may be supported in the compartment 163 by a suitable bracket 203. The mirror 202 is angular with respect to the bottom of the compartment 163, and is so positioned relative to the lens 201 that it will receive the images of the symbols, characters and numerals, and project the same on to the film via the window 170, as above described.

The compartment 164 is provided with a suitable bracket 204 which forms a support for a mercury tube 205. This tube when normally supported by the bracket 204 is in line with the window 169 in the bottom of the compartment 164 so that each time the mercury tube 205 is illuminated, the image of whatever amount shown in the record 60 via said window at the time will be photographically printed or recorded upon the record 117.

The mercury tube 205 is associated with the photoelectric cell 179 in suitable circuits which will presently be described, so arranged that the mercury tube 205 will glow only when the cell 179 is in total darkness.

In using the new and improved apparatus for classifying, sorting, etc., the operator, after having completed a set-up and before starting an actual run of the device, presses a button which will cause a mercury tube 198 to glow and thereby illuminate the characters, symbols or numerals 189 on those bars which have been set by advancing them forward in the manner described; the characters, symbols or numerals withdrawn from beneath the bar 186 by this operation are actually photographed on the film 117. The advancing of the members 185 just described of course brings the holes 188 in the members forward from beneath the 181ª so that light from the lamp 193 may or may not pass via said holes to the film in accordance with the appearance of the characters or symbols on the record, which will now be described.

Referring now to Figure 10, which illustrates a portion of the record, the amounts recorded appear in a column designated by the numeral 206. The record also contains a series of columns headed "1," "2," "3," "4," "5," "6," "7," "8," "9," "0" and "A," "B" and "C." Horizontally in line with the various amount entries in the column 206 appear, in certain of the columns headed "1," "2," "3," "4," etc., just described, black rectangles, circles or squares; for example, in line with the first entry of $5.00—black rectangles appear in the columns "3," "8" and "A"; in line with the next entry of $6.00, these black rectangles appear in columns "3," "9" and "A"; while in line with the third entry, black rectangles 564 appear in columns "1," "8" and "C." When the record is in operative position, the item entries in the column 206 are in line with the window 169 in the compartment 164, and the black rectangles are in line with the slidable members 185 beneath the chamber 168.

Figure 13:
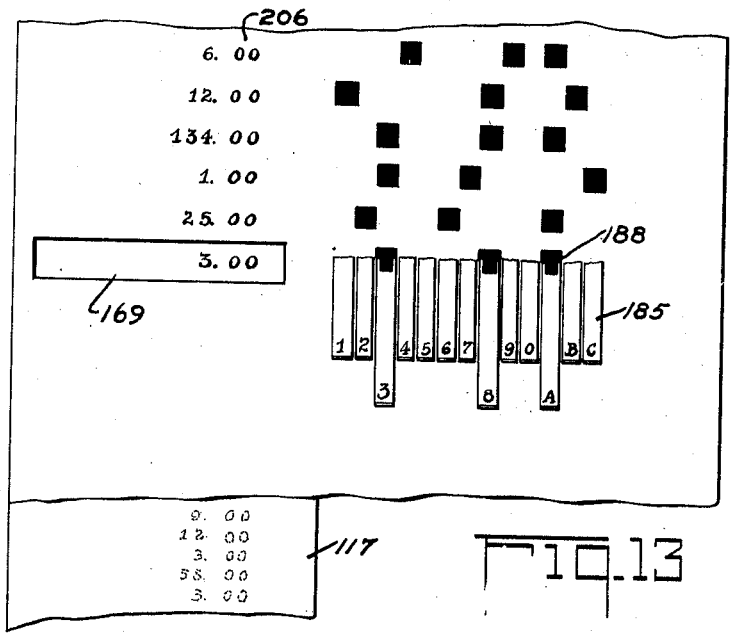
Figure 13 is a diagram illustrating the operation of the masking device in which the symbols representing the desired classification changing the quantity of light passing through the masks to the photo-cell shown in Figure 6, thereby causing the device to photograph the item classified by said symbols upon a photo-sensitive film such as that shown in Figure 7.
Figure 14:
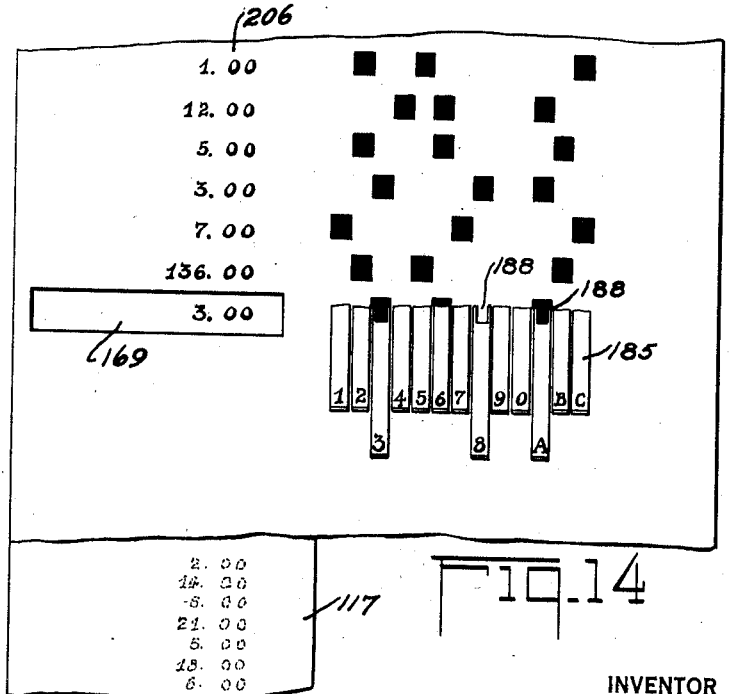
Figure 14 is a diagram similar to that shown in Figure 13 in which the masks have the same setting, but illustrating a different group of classifications in line with the masks.

Figures 13 and 14 show the record in relation to the slidable members 185 and the window 169 in relation to the column 206, the columns "1" to "9" inclusive, "0," and "A," "B" and "C" being in line with slidable members 185 correspondingly marked.

Now, referring specifically to Figure 13, it will be noted that the slidable members 185, labeled "3," "8" and "A," have been advanced so that their holes 188 are in line with the lamp 193 and the cell 179. As above described, the mercury tube 205, above the window 169, in the compartment 164, is only illuminated when the cell 179 is in total darkness.

With the record in the position shown in Figure 13, the black rectangle in the "3" column, the black rectangle in the "8" column, and the black rectangle in the "A" column, cover the holes or openings 188 and thereby prevent light from the lamp 193 from falling upon the plate 180 of the cell 179. This causes the mercury tube 205 to glow, with the result that the item entry $3.00 appearing in the window 169 to be recorded upon the film 117, and in cases where the items fall in sub-classes, as designated in the column 563 (Figure 10), such sub-classifications will also be recorded in line with the item entry, which in the instance just described is $3.00. If the symbol in line with the $3.00 entry had been black rectangles in columns "3," "6" and "A," such as shown in Figure 14, the $3.00 item would not be recorded on the film 117, because although the black rectangle in the "3" column, and the black rectangle in the "A" column effectively close the holes 188, the hole in the slidable member 185 in the "8" column is not closed; therefore, at least some light from the lamp 193 does fall upon the cell 179, with the result that the mercury tube 205 is not illuminated, and, therefore, the $3.00 amount appearing in the line with the window 169 cannot be recorded or printed because the mercury tube 205 is not illuminated.

In connection with Figure 14, it might be pointed out that the fourth entry in the column 206, counting from the top—which is also an amount of $3.00—will be printed or recorded when it arrives in the window 169 due to the fact that the black rectangles in line with this entry are positioned in columns "3," "8" and "A." The spacing mechanism for the film 117, previously described above, is controlled in accordance with the printing or recording of items falling in the classification for which the machine is set up. Control is effected through the medium of the magnet 157 which has been described, and which will further be described in detail in connection with the circuit diagrams.

The reel 175, Figure 7, has connected to its hub 115a a conductive tape, web, or ribbon 207, a detail of which is shown in Figure 32, having its end 208 made in the form of a hook. The film 117 has a member 209 secured to the end thereof, and the member 209 has a slot 210 formed therein. When the sensitized film is to be reeled on the reel 175, prior to being inserted in the machine, the member 209 on the end of the film 117 is attached to the tape 207 by means of the hook 208 passing through the slot 210, after which the reel 175 may be filled with sensitized film and made ready for use in the machine. The manner of mounting and using the reel has hereinbefore been described. When the supply of sensitized film on the reel 175 becomes exhausted, the metallic tape or ribbon makes metallic contact with the roller 119, thereby energizing a relay 440, and through the medium of said relay disabling the motor circuit. This will presently be described in connection with Figure 15.

The metallic tape is metallically connected to the hub 115a of the reel 175 which is in turn in metallic contact with the shaft 174 of the machine.

Likewise, the record 60, Figure 2, is connected to the reel 68, a metallic tape exactly like the tape 207 being interposed between the end of the record and the reel 68, and the other end of the record is connected in the same manner through the medium of a similar metallic tape to the reel 81. The conductive tape, ribbon or web, associated with the record 60 and reel 68, is conductively connected to the reel 68 and to the shaft 71, and the one associated with the other end of the record is metallically connected to the reel 81 and to the shaft 82. These metallic webs associated with the record are utilized for controlling the automatic reversal of the record fed through the medium of magnetic clutches and relays.

Figure 15:
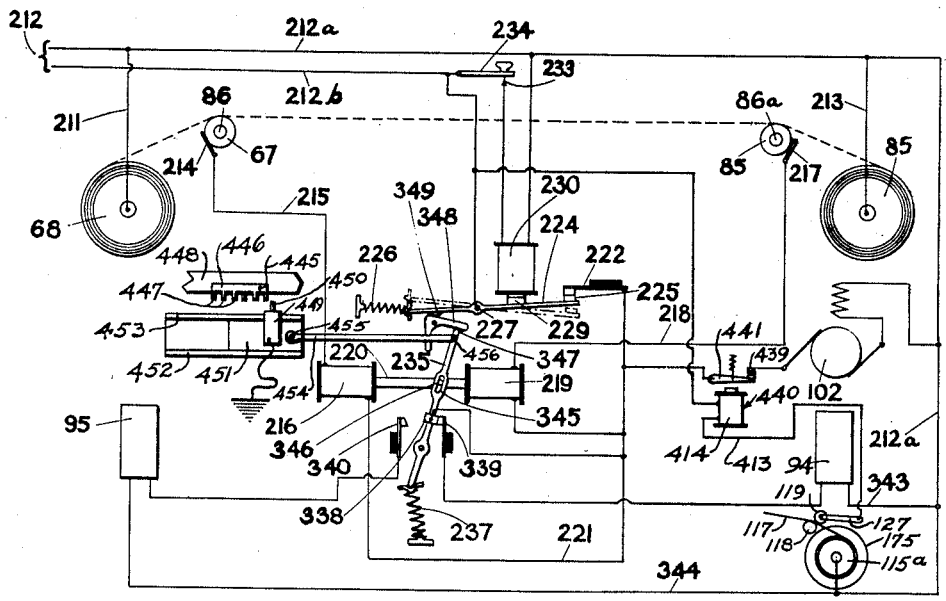
Figure 15 is a circuit diagram of the driving and reversing means, and controls therefor.

One method of connecting these elements to effect such control is illustrated diagrammatically in Figure 15.

The reel 68 is connected by means of a wire 211 to one side 212a of a source of current 212, and the reel 81 is connected by a wire 213 to the same side 212a of said source. The roller 67 is connected by means of a brush 214 and a wire 215 to one terminal of a solenoid 216.

The roller 85 is connected by means of a brush 217 and a wire 218 to one terminal of a solenoid 219. The other terminal of the solenoids 216 and 219 are connected to a contactor arm 222.

The switch arm 224 is provided with a contact point 225 adapted to make contact with the arm 222. The switch arm 224 has associated therewith a toggle spring 226 adapted to retain the switch arm in either one of its two positions in which it is placed. The switch arm is mounted on a pivot 227 and is connected to the other side 212b of the source of current 212. An armature 229 is secured to the switch arm 224 and an electro-magnet 230 is positioned in cooperative relation with said armature so that when said magnet is energized, the armature 229 will be attracted, thereby moving said switch arm to such position that the contact 225 establishes contact with 222. The electromagnet 230 has one terminal connected to 212a, and its other terminal connected to a contact point 233. A push-button switch 234 positioned in cooperative relation with the contact 233 is connected to 212b so that when the same is closed, the magnet 230 will be energized.

The solenoids 216 and 219 are in alignment with each other and oppositely disposed, and control a plunger 220. A pivoted switch arm 235 has a toggle spring 237 adapted to retain said switch arm in either one of its two positions.

This arm carries contacts 338 which, when in one position, make contact with contacts carried by the contact arm 339, and when in its other position to contact with contacts carried by the arm 340.

The contact arm 339 is connected to the magnetic clutch 94, and the contact arm 340 is connected to the magnetic clutch 95. The return wire 343 of the magnetic clutch 94 is connected to 212ª, and the return wire 344 of the magnetic clutch 95 is also connected to the side 212ª of the source.

The switch arm 235 has formed therein a slot 345, and a pin 346 carried by the plunger 220 forms a working fit in the slot 345 so that when, for example, the solenoid 216 is energized the plunger 220 is moved to the left, as viewed in Figure 15, thereby moving the switch arm 235, through the medium of said slot and pin, thereby breaking contact with the contact arm 339 and establishing contact with contact arm 340.

During the movement of the switch arm 235, just described, the upper end 347 of this arm which is in engagement with the camming member 348, moves said member in a clockwise direction, as viewed in Figure 15, thereby causing the switch arm 224 to break contact with 222, due to the engagement of the high part of the camming member 348 with the bumper 349 which is secured to the switch arm 224.

The motor 102 has one terminal connected to the contact arm 222, a contact 439 and an armature or contact arm 441 of the relay 440 being included in this circuit, and its other terminal connected to 212ª so that when the contact point 225 of the switch arm 224 establishes contact with 222, current will be supplied to the motor.

The hub 115ª of the reel 175 is connected to the wire 344. The yoke 127 is connected to one terminal of the relay magnet 414, and the other terminal of the coil is connected to the wire 212ᵇ so that in the event the supply of film 117 becomes exhausted a magnet 414 of the relay 440 will become energized, thereby attracting the armature 441, pulling the same out of contact with the contact point 439 thereby disabling the motor circuit and stopping the machine from operating.

Figure 16:
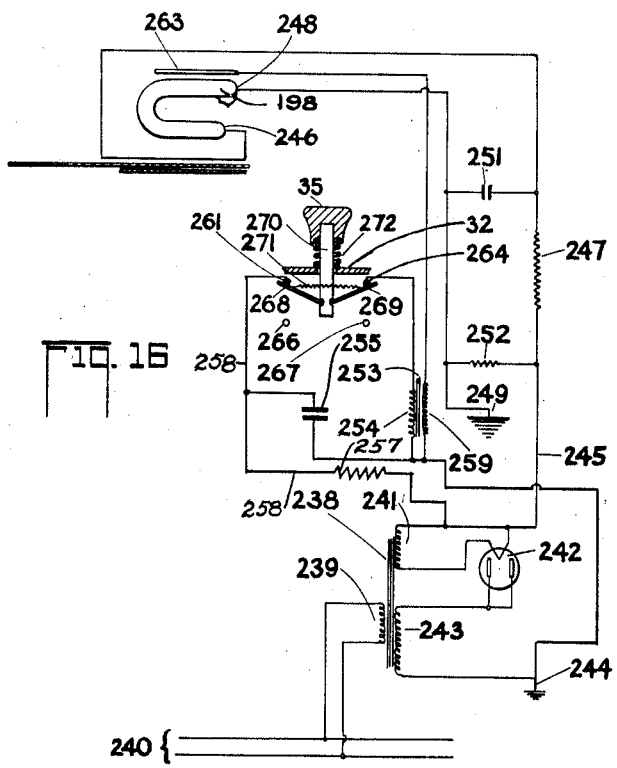
Figure 16 is a circuit diagram showing the controls for the means for recording classification settings.

As hereinbefore explained, the recording of the classification headings on the film 53 is effected prior to any given classification listing. The circuits for controlling the illumination of the tube or lamp 198 are shown in Figure 16.

The power transformer 238 has its primary winding 239 connected to a branch line 240. A heater winding 241 is provided for the filament of a rectifier tube 242. A high voltage winding 243 provided in this transformer has one end connected to the plates of the rectifier tube 242, and the other end is grounded at the point 244. A wire 245 having one end connected to the filament of the rectifier is provided for furnishing current to the anode 246 of the tube 198, through a resistor 247. The cathode 248 of the tube 198 is grounded at the point 249.

A condenser 251 bridges the anode and cathode, one terminal thereof being connected to the wire 245 between the resistor 247 and the anode 246. A biasing resistor 252 bridges the wires 245 and 250 ahead of the series resistor 247. The primary 254 of the high voltage induction coil 253 has one end thereof connected to ground, and its other end connected to a switch contact 264.

The other stationary contact 261 of the switch 35 is connected to the filament of the rectifier tube 242, said connection having a resistor 257 in series therewith. A condenser 255 has one end thereof grounded and its other end connected to the wire 258 at a point between the switch contact 261 and the resistor 257. The switch is also provided with stops 266 and 267 against which the blades 268 and 269 normally rest. The blades are pivotally socketed in the push-rod 270 and a spring 271 tends to urge the ends of the switch (opposite to those pivoted in the rod 270) toward each other. If the line of pull of the spring 271 is above the pivotal point in push rod 270 the blades are urged upwardly and make contact with contact members 261 and 264. When the line of pull of the spring 270 is below the pivotal point, the outer ends of the blades 268 and 269 are urged downwardly by the spring and contact the stops 266 and 267. In other words, this is the usual toggle switch action.

The push-button 35 is secured to the upper end of the push-rod 270, and a spring 272 bearing against the push-button 35 and against the surface of the plate 32 urges the push-button 35 upwardly, with the result that the blades 268 and 269 normally are at rest in contact with the stops 266 and 267. When the push-button 35 is depressed, due to the toggle action of the spring 271, the blades 268 and 269 respectively make contact with the switch contacts 261 and 264 (in the position shown in the drawings, Figure 16).

The secondary 259 of the high voltage induction coil 253 has one end connected to ground, and the other end is connected to a conductor 263 positioned outside of and adjacent the glass envelope of the tube 198 in the vicinity of the pool of mercury therein.

The operation of the tube 198 is quite simple. It consists of a glass or quartz envelope with a quantity of mercury sealed therein and two electrodes, one of which has been referred to as an anode and the other as a cathode. It may be assumed that the cathode is immersed in the mercury. At ordinary temperatures and under ordinary electric stresses this tube is a non-conductor. In order to draw electronic emission from the surface of the mercury, a conductor 263 is positioned closely adjacent to or in contact with the outside of the tube in the neighborhood of the cathode and the pool of mercury so that by means of an external and powerful electric field, electronic emission may be drawn from the surface of the mercury.

When the switch is in the position above referred to, the high voltage through the circuit just closed, and which may be termed the auxiliary circuit, establishes the extraordinary electric field necessary to draw electronic emission from the surface of the mercury inside the tube 198. Once this emission is started, it can then be maintained by a relatively low intensity electric field.

The duration of this discharge is in accordance with the capacity of the condenser 251, and the voltage to which it was charged. This condenser will be almost completely discharged by this emission within a period of time measured in microseconds; therefore, it can be readily seen that when the specially formed film 53 is positioned in the device in the manner described, and the push-button 35 is depressed prior to making a run, the tube 198 will glow at high intensity and with powerful photo-active value for a very short length of time which may be measured in microseconds, as above stated.

Referring now to Figure 17, which is a circuit diagram of the controls for film advancing and item photographing means, a transformer 273 has its primary 274 connected to a branch line 275. A heater winding 277 of the transformer is connected to the filament of a rectifier tube 278. A high voltage winding 279 has one end thereof connected to the plates of the rectifier tube 278, and the other end grounded at 281ª. The transformer and rectifier just described furnishes power for operating the mercury tubes 205. The cathode 282 is connected to ground at 281ª.

The anode 284 of the tube 205 is connected to a resistor 286, and thence to the filament of the rectifier 278. The condenser 288 bridges the anode and the cathode of the tube 205.

The high voltage induction coil 289 has one end of its primary 290 connected to ground at 281ª; and the other is connected to the contact point 302 of the relay 298.

The secondary 293 of the high voltage induction coil has one terminal thereof connected to a conductor 295 which is positioned closely adjacent the envelope of the mercury tube 205 in the vicinity of the anode and pool of mercury. The other end of the secondary 293 is connected to ground, and one terminal of the electro-magnet 157 is also connected to ground controlling the feed of the ratchet 148 hereinbefore described. The other terminal of the magnet 157 is connected to a contact point 301.

The armature 297 of the relay 298 is connected to the source of high voltage through a resistor 291 and a condenser 300 by-passes the same to ground.

The contact points 301 and 302 are so positioned relative to the armature 297 that when the armature is attracted by its magnet, to be presently described, 297, 301 and 302 will be connected together, so that current will be supplied via the wire 560 and the armature 297 to the primary 290 of the induction coil 289, and via the contact point 301 to the magnet 157 will also be supplied with current.

A transformer 304 has a primary 305 connected to the branch line 275, and a secondary 306 for furnishing current to the filament of the rectifier tube 307, the connections being made via wires 308 and 308ª.

The transformer 304 also has a high voltage secondary 309 having its terminals connected to the plates of the rectifier 307, and a center tap thereof connected to the ground 311.

The transformer 304 also has a heater winding H which is connected to the heater H' of the tube 312. These last-named heater connections are not actually shown, it being customary in electronic circuits to indicate such connections in order to make the circuit diagrams less complicated.

The filament wire 308 is connected via chokes 314 and 315 and via a wire 316 to a wire 317. A filter condenser 318 bridges the choke 314, and the condenser 321 bridges the choke 315, the condenser 320 being in series between the common connection between the filter condenser 318 and 321 and the chokes 314 and 315.

The condenser 321 has one terminal connected to a wire 316 and the other terminal grounded via the wire 319.

The photo-electric cell 179 has its cathode 180 connected to the ground 311, and its anode 180ª connected to the control grid 326 of the tube 312. The screen grid 327 of the tube 312 is connected to the wire 317 so that it will receive the full voltage of the rectifier. The plate 328 of the tube 312 is connected to one terminal of the coil 330 of the relay 298. The other terminal of the coil 330 is connected to the wire 317, so that when plate current flows in the tube 312, the coil 330 will be energized. The cathode 331 of the tube 312 is connected to one arm 333 of the potentiometer 334. The potentiometer winding is connected between the wire 317, which is the high voltage supply, and ground so that the bias in the tube 312 may, by means of the arm 333, be set to a point where plate current will flow only as long as the photo-electric cell 179 does not receive any light (passing via holes 188) from the lamp 193.

The grid lead 325 is connected via a resistor 313 to a potentiometer arm 322 so that bias on the grid 326 may be adjusted to any desired value. In adjusting the tube 312 so that plate current will flow only when the cell 179 is dark, both the arm 333 and the arm 322 might be adjusted. A biasing resistor 324 is connected from the wire 287 (ahead of the series resistor 286) and to the ground 281ª. From this it will be seen that when no light passes to the cell 179, due to the coverage of the holes 188 by characters or symbols 189, the coil 330 of the relay 298 is energized, thereby closing the contacts 301 and 302 and actuating the mercury tube 205. At the same time, the magnet 157 is energized, thereby attracting the armature 150 and advancing the pawl 149 on the ratchet wheel 148. As soon as the condenser 288 discharges through the tube, the coil 157 is no longer energized and the spring 154 pulls the armature into reverse direction, thereby advancing the ratchet wheel 148.

The magnet 157 has on the same core so as also to affect the armature 150, a second winding 443 which has one terminal connected to obtain voltage from the rectifier. The other terminal of this winding is connected to a contact strip 446 having a plurality of contact points 447. The contact strip 446 is mounted on a suitable insulator 448.

A suitable brush holder 449 carries a brush 450. This brush may be restrained in the brush holder 449 so that it may come into engagement with the contact points 447 without being wrecked. The brush holder 449 is mounted on a slide plate 451, which is in turn slidably mounted on ways 452, 453, which are mounted in fixed relation on the frame of the device.

A suitable rod 454 has one end thereof pivotally connected to the slide plate 451 at 455, and the other end is, referring now to Figure 15, pivotally connected to the switch arm 235, such pivotal connection being indicated by the numeral 456.

The brush 450 and its holder 449 is connected to ground so that as the brush is moved to successively contact the contact points 447, a series of impulses will be delivered to the winding 443 thereby, through the medium of the armature 150 and the pawl 149, advancing the ratchet wheel 148 a number of steps of teeth, corresponding to the number of impulses. This results in feeding the film 117 forward a number of spaces depending upon the number of impulses delivered to the magnet 443.

The purpose of this impulse device is, at the end of a run, to advance the film to a point where the photographing of the slides 185 to show the next setup will not be made upon or overlapping the last few items imparted to the film on the run just previously completed. For example, referring to Figure 9, the last few items imparted to the film via the opening 169 at the end of the run will lie immediately beneath the portion of the bottom of the compartment 164 and beneath the compartment 163. If this film is not advanced so that these items have passed the range of the window 170, the recording of the setup at the beginning of the next run will fall upon items already recorded. Therefore, a series of impulses applied in the manner described above will advance this film to a point where the last item recorded from the previous run will be beyond the window 170, thereby preventing the recording of the setup from overlapping the items of the previous run.

It has been explained above in connection with the diagram shown in Figure 15, at the end of a run of the record in either direction the solenoid 216 or the solenoid 219 becomes energized due to the metallic strip on one end thereof making contact with the roller 85, while the metallic strip on the other end makes contact with the roller 67, as shown in Figure 15.

The circuits for controlling the illumination of the tubes 49 shown in Figure 8, by means of the lamp 70, photoelectric cells 65 and the record 60, as arranged in Figure 31, are shown diagrammatically in Figure 18.

It will be noted in Figure 5 and Figure 31 that the light sensitive cell casing is provided with one row of perforations 66a through which light from the lamp 70 may impinge upon the cell 65 near the left end thereof, and is provided with three rows of perforations 66 through which light may impinge upon the cell near the base end thereof. It will also be noted that the film 53 along the sectional edge has a perforation on the left edge in line with the perforation 66a, and a perforation in line with the left hand perforation 66, the latter representing the portion of the "A" classifications. The film 53 may be seen in Figures 11 and 12.

Before beginning any given classification listing, as above referred to, a record is made of the entire classification content of the collective record—that is to say, the record 60—to determine which classifications it contains. In order to accomplish this, the record 60 is run continuously through the machine three times.

The first time it is run through the machine, a film 53 having a row of "A" perforations therein is positioned, as shown in Figures 8 and 31, to have recorded thereon, as shown in Figure 12, the "A" classifications which are contained in the entire record 60.

The record 60 may then be run in the reverse direction with the film 53 in the machine having a row of "B" perforations (perforations membering up with the center row with the perforations 65 shown in Figure 5), thereby recording on the "B" film 53 all of the "B" classifications contained in the record 60.

The third run of the record 60 through the machine is made with a film 53 having a row of "C" perforations in line with the right hand perforations 66 (Figure 5).

By these three steps the operator has three films 53, from which is recorded and indicated the various classificatons contained in the general assembly of items so that the operator can determine whether or not any items of a predetermined classification is included in the assembly—that is to say, the record—and from said film 53 may further determine the number of steps necessary to take in preparing a list of items of certain predetermined classifications.

Considering Figures 5 and 31 as shown, the film 53 has a row of perforations 66a on the left, having values of from "1" to "9" inclusive, and on the right a row of "A" perforations so that on each item a dark spot appears in the "A" column of the record, and one of the numerical positions on the left, thereby preventing light from reaching the cell via a perforation 66a and a perforation 66 in the "A" position; the prevention of such light from falling upon the photo-electric cell 65 will cause the mercury tubes 49 to become illuminated momentarily. This illustration passes via the slots 51 in Figure 8 and the leg 57 of the Y-slots to the record 60, and any light reflected from the record at that instant will project up the leg 58 of the Y-slot on to the lower sensitive surface of the record 53.

The circuits showing the illumination of the tube 49, are shown diagrammatically in Figure 18 and since equivalent circuits were shown and described in connection with Figures 16 and 17 for controlling the same types of flash tubes, Figure 18 is not described in detail.

When symbols appear in the record 60 in such positions that light from the lamp 70 is prevented from falling upon the elements of the cell 65, plate current will flow in the plate circuit, thereby energizing the magnet 380. This results in the attraction of the armature 412 by the magnet, causing the armature to establish contact with the contact point 571 thereby impressing high voltage upon the conductor 409 and causing the mercury tube 49 to operate under the discharge of the condenser 408. Light from the tube 49 will, as viewed in Figures 8 and 19, pass through the filter 50 and thence via a slot 51, a perforation 54 in the film 53, and the leg 57 of the Y-slot, and will fall upon the record 60. If a dark symbol appears on the record 60 beneath the bottom leg of the Y-slot at the instant the tube 49 is illuminated, the light reflected therefrom via the leg 58 of the Y-slot falling upon the lower sensitized surface of the film 53 will affect said surface.

The expression "dark symbol" referred to hereinbefore as a "black" symbol, may be of or contain any material capable of reflecting the light or other radiant energy on to the underside of the film 53. The record 60 may be of such color that it will absorb light passed by the filter 50. In fact, different band pass filters 50 may be utilized in the device provided the record used with any of the given filters is of such color that it will absorb the energy passed by the filter. With this in view, the new and improved method is not applicable to one specific band of radiant energy, instead it may be applied over a wide band or bands of frequencies.

In the embodiment of the invention illustrated in the drawings, particularly in Figure 12, the position of the filter 50 relative to the film 53 is indicated in dotted lines, and it will be noted that this filter does not overlap the perforations 54, 54a to 54hh. The reason for this is that the perforations 54, 54a to 54hh control the illumination of the record 60 via the perforations 570, 570a, etc., to 570h. However, it must be understood that the filter may overlap the control perforations (54 etc.), without departing from the spirit of the invention in view of the fact that photo-electric cells 65 particularly sensitive to the wave lengths passed by the filter may be employed for controlling the illumination of the mercury tubes 49.

The film shown in Figure 12 shows the preliminary classifications photographically recorded thereon. Assuming that the tube 49, shown in the diagram of Figure 18, is provided for illuminating the perforations 570 in Figure 11, under the control of the perforations 54 and 54a, a second mercury tube 49a would illuminate the row of perforations 570a under control of perforations 54a and 54aa.

In Figure 11, the vertical row of perforations along the right hand edge as illustrated are in the "A" position, and controls for obtaining classifications which contain the letter "A."

For "B" classifications, the perforations would be a little nearer the right edge of the film 53. For example, in the positions shown in Figure 12 and designated as 54B.

For "C" classifications, the perforations would be in a row adjacent to the right hand edge of the film 53, or in the position shown dotted in Figure 12 and designated by the numeral 54C.

As hereinbefore described, it is necessary to make a preliminary listing of the classifications under class A, followed by preliminary classifications under class B and class C, by making three complete runs of the record, changing the films 53 between each run. In making the first run, the "A" classifications would appear in a vertical line only of the film in the positions designated by the numeral 54. In making the second run, the perforations would appear in the vertical line as indicated in Figure 12, as 54B; and in making the third run, the perforations would appear in a vertical line as 54C.

In Figure 18, the connections between the photocell 65b and tube 49b have been omitted to keep the diagram from becoming complicated; likewise, the controls between the cell 65c and the tube 49c, 65d and 49d, etc., have also been omitted from the diagram, Figure 18, for sake of clarity, such connections being similar to those described in connection with the cell 65 and the tube 49.

Figure 30:
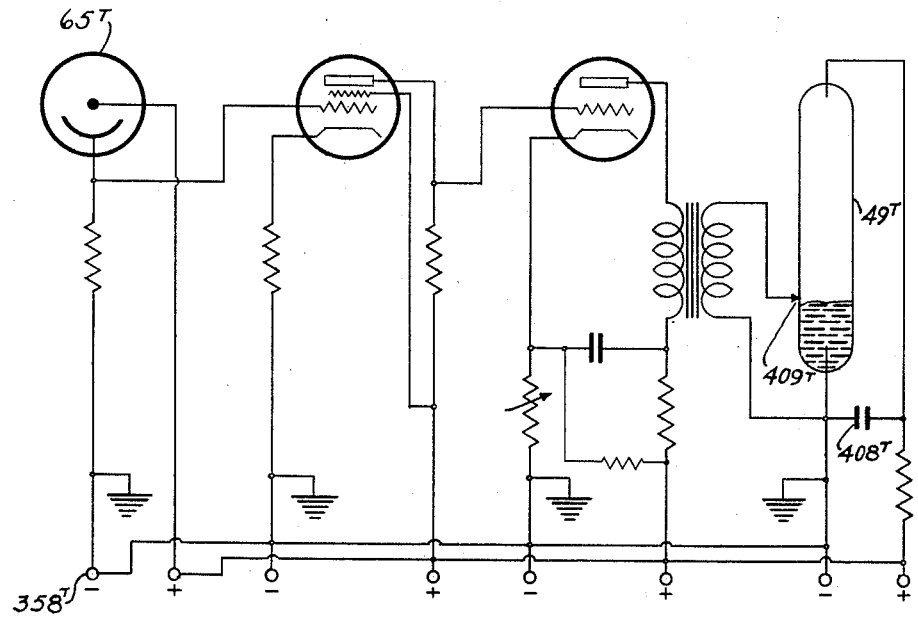
Figure 30 is a circuit diagram showing the use of a Thyratron tube, instead of a relay, for controlling flash mercury lamps.

It is obvious that Thyratron tubes may be utilized in the electronic circuits to take the place of the relays, such as the relay 381 for example. A simple arrangement of such a circuit is illustrated in Figure 30, in which the mercury tube 49T, corresponding to the mercury tube 49 in Figure 18, is controlled by a photo-cell 65T corresponding to the cell 65.

Due to the fact that the circuit shown in Figure 18 only is used for recording the various classifications contained in the general assembly of items on the record prior to the selection therefrom of items of specific classification for obtaining records such as shown in Figure 12; and due to the fact that the circuits shown in Figures 15, 16, and 17 are utilized for selecting and recording data from the record and for controlling the machine, a switch such as shown in Figure 22 is utilized for controlling the circuits shown in Figures 15, 16, 17 and 18. Although any suitable type of switch may be employed for this purpose, the switch arrangement illustrated in Figure 22 is illustrative of one means by which said circuits may be controlled. This switch consists of movable switch arms 457 and 458, each of which may be joined at one end thereof to a bar of insulation 459. The switch arm 457 is connected via a wire 460 to one side of a source of current 461, and the switch arm 458 is connected via a wire 462 to the other side of said source.

Stationary arms 477, 479 and 481 are provided with suitable contacts and are adapted to be connected together and to the switch arm 457 when the knob 468 is moved downwardly. This same movement at the same time connects the switch arms 478, 480, 482 together with the switch arm 458 thereby connecting the branch circuit 240 (which energizes the circuits shown in Figure 16) to the source of supply 461 and connecting the branch line 275 and the branch line 212 to said source. The branch line 275 energizes the circuits shown in Figure 17 and the branch line 212 feeds the circuits shown in Figure 15.

When the knob 468 is thrown upwardly the switch arm 457 establishes contact with the switch arm 463 and the switch arm 458 establishes contact with the switch arm 464 thereby connecting the branch line 354 to the source 461 and feeding the circuits shown in Figure 18.

The insulating bar 459 connecting the switch arms 457 and 458 are provided with notches 471, 472 and 473 which are adapted to be engaged by a spring loaded member 476 for holding the switch in whichever position it is thrown.

The switch arms are connected to the various branch circuits and to the source of current supply as indicated.

As evidence of the fact that I have conceived an entirely new method of recording which method is not limited to any specific portion of the spectrum, another embodiment of the invention will now be described which employs means for recording which lies in an entirely different portion of the electromagnetic spectrum than the means employed in the apparatus described above. The result in this method is in some respects similar to the "Lichtenberg" effect.

This new embodiment of the invention employs electromagnetic radiation outside the visible spectrum, and by my method it is possible to vary the transmission of such radiation sufficiently to have a controlling effect. The selection or elimination of any portion of the frequency spectrum may be effected by means of suitable filter arrangements.

The term "filter" may be taken to mean any medium whose transmission characteristics are such that it is conductive to a fixed band or bands of frequencies and is non-conductive at all other frequencies, due to the fact that any filter to be effective must operate within its natural scope, therefore, "light" filters should be used both in the optical frequency range and in ranges above and below the visible spectrum, while electric wave filters must be used in the range of electrical frequencies.

A low pass filter is conductive below a certain cut-off frequency within a particular frequency range of the spectrum, and a high pass filter is one which is conductive above a certain cut-off frequency.

Figure 25:
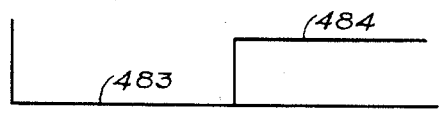
Figure 25 is a diagrammatic representation of a portion of the spectrum showing the influence of a high pass filter.

By combining certain filters in a proper combination, a band elimination filter may be formed. For example, Figure 25 shows a portion of the spectrum 483 and the relation of a high pass filter 484.

Figure 26:
Figure 26 is a diagrammatic representation of a portion of the spectrum showing the influence of a low pass filter.

Figure 26 shows a band of the spectrum 483a and shows the relation of a low pass filter 485 thereto.

Figure 27:
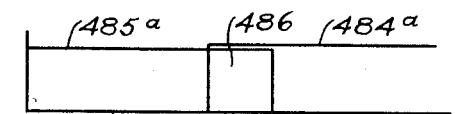
Figure 27 is a diagrammatic representation of a portion of the spectrum showing the band pass effect of high and low pass filters overlapping.

Figure 27 shows a band pass arrangement, the spectrum being indicated by 483b, the high pass effect being indicated by the numeral 484a, the low pass effect by the numeral 485a, and the overlapping area being indicated by the numeral 486.

Figure 28:
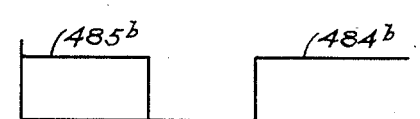
Figure 28 is a diagrammatic representation of a portion of the spectrum showing high and low pass filters effecting band elimination.

Figure 28 diagrammatically illustrates band elimination, a portion of the spectrum being indicated by the numeral 483c, the low pass effect by the numeral 485b and the high pass effect by the numeral 484b.

Referring now to Figure 23, an example illustrating the employment of the electro-magnetic waves, which are beyond the optical range, is given.

Instead of employing the slides 185 for setting up the classification to be selected, and instead of employing the mercury lamp 205 to effect the recording, a plurality of push-buttons—which are in effect switches—may be employed, such switches being normally closed and which when opened remain open until again closed. One of these switches is generally designated in Figure 23 by the numeral 487, and is adapted to close contacts 488 and 489, thereby short-circuiting the resistor 490 and the discharge points 491 and 492.

In operating this system, an example will be presently described in which the same selections are to be made and described in connection with the first embodiment described—that is to say, the selection of classification 38$^A$, which would require that the "3" push-button, the "8" push-button and the "A" push-button be opened, all the others remaining closed. A plurality of resistors, one of which was above mentioned designated by the numerals 490, 490$^a$, 490$^b$, etc., to 490$^m$, are connected in series, each bridging the discharge points 491, 492, 491$^a$, 492$^a$, etc., through 491$^m$, 492$^m$.

The push-buttons or switches 487, 487$^a$, through 487$^m$, when closed respectively, bridge the discharge points and short out the resistors. The discharge point 492 is connected to the discharge point 491$^a$, and is in turn connected to a point between the resistor 490 and the resistor 490$^a$. A wire 493$^a$ connects the discharge point 492$^a$ to the discharge point 491$^b$; and a wire 494$^a$ connected 493$^a$ to a point between the resistors 490$^a$ and 490$^b$, etc., a wire 493$^l$ serving to connect the discharge point 492$^l$ to the discharge point 491$^m$, and a wire 494$^l$ serving to connect the wire 493$^l$ to a point between the resistors 490$^l$ and 490$^m$.

A wire 495 connects the discharge point 492$^m$ to one terminal of a high resistance relay 496; and a wire 497 connects the wire 495 to the other end of the resistor 490$^m$.

A wire 495 is connected to one terminal of the coil 498 of the high resistance relay, and to a contact point 499; the other end of the coil 498 is connected to a source of energy 501 and to the contact point 503 of the relay 496. This relay has an armature 504 which normally closes the contact points 499 and 503 and which is adapted to be attracted by the winding 498 when the latter is energized by a current having a predetermined strength, thereby opening the contact points 499 and 503 and permitting the circuits to function, as will be described.

A low resistance relay 505 has one end of its coil 506 connected to one end of the resistor 490, and the other end of its coil connected to the source of energy 501. The armature 509 is connected to a source of energy 510, the latter of which is connected via a wire 511 through a resistor 512 and via the wire 513 to the primary 514, of a high tension induction coil 515. The other end of the primary is connected to the contact point 517 which is adapted to be contacted by the armature 509 when the coil 506 is energized. A condenser 518 is connected from the wire 513 to the armature 509 bridging the source of energy 510 to the resistor 512.

The secondary 519 of the high tension coil 515 has one end thereof connected to ground at 521 and to a suitable ground plate 522 and the other end is connected to a suitable metallic brush 524, which is adapted to contact the symbols in the records, the record being designated by the numeral 60$^a$, and the photo-sensitive film, which may be negative or positive film stock, is designated by the numeral 117$^a$. The brush 524 may preferably be in the form of an elongated wire brush spanning all the classification symbols in the record 60$^a$, although in Figure 23 the brush is represented as spanning only two numerals of an item, as a matter of fact it would span the entire item space so that it would take care of the largest possible item entry on the record.

All of the push-buttons 487 to 487$^m$, inclusive, have associated therewith, a bar indicated by the dotted line 525, such mechanism being pivoted at 526 so that a lever 527, indicated in dotted lines, engaging the armature 504 will prevent the armature from moving out of contact with contact points 499 and 503 when less than three of the switches 487 to 487$^m$ are opened. When more than three of the switches are opened, the current flowing through the winding 498 will not be strong enough to cause the armature 504 to be attracted to open the contact points 499 and 503, therefore the operator must make the proper set-up before the device is operated.

The discharge points 491, 492 to 491$^m$, 492$^m$, respectively, contact the designation blocks on the record 60$^a$.

The designation blocks on the record and the items entered thereon are of a material which includes preferably a metallic source or which are at least conductive to electric current. For example, the designation blocks should not be of a higher resistance than that capable of supplying current via three paths of discharge points to the winding 506 of the low resistance relay 505. This enables the winding 506 to attract the armature 509, thereby closing the primary circuit which includes the primary winding 514 of the induction coil 515. The high tension current is generated in the secondary 519, which is delivered to the brush 524, contacting the item entries which are also conductive as described above, and due to the "Lichtenberg" effect the item is recorded on the film in relief, much in the manner shown in Figure 24.

Figure 29:
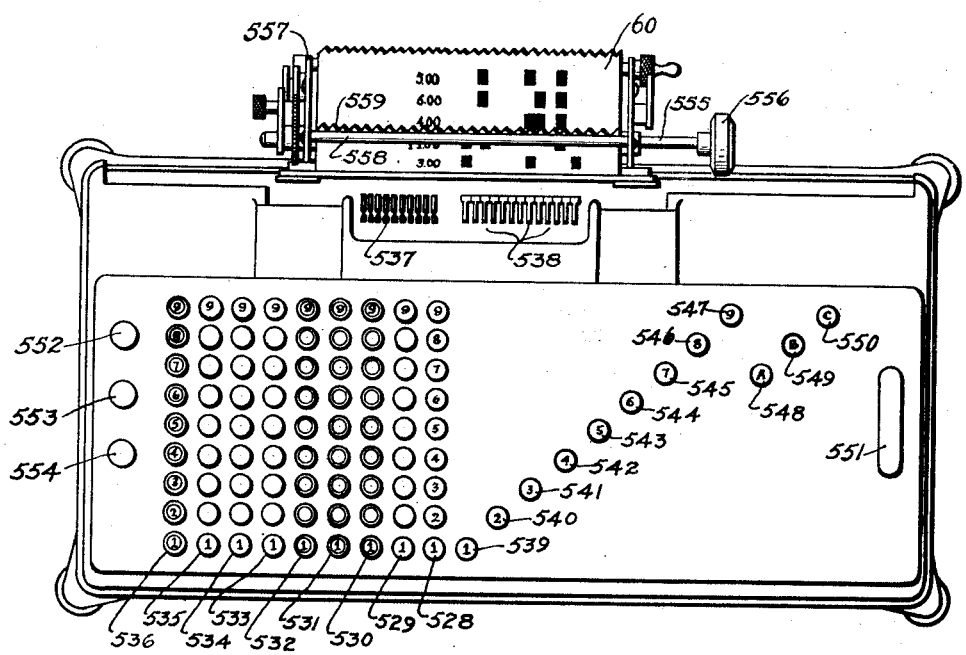
Figure 29 is a view of a machine capable of making records such as that illustrated in Figure 10.

A machine suitable for making records, such as records 60 (such as that shown in Figure 10) is illustrated in Figure 29. A bank of keys consisting of rows 528, 529, 530, 531, 532, 533, 534, 535, 536, is provided for item entries. Set-ups effected in said bank of keys actuate the printing bars 537 for printing the item entries in the usual and well known manner. A series of keys 539, 540, 541 through 547, are provided for effecting the printing of blocks representing numeral designations; and keys 548, 549, 550 are provided for effecting the printing of blocks representing letter designations. A series of bars for effecting the printing of these designation blocks is indicated by the numeral 538. A motor bar 551 is provided for operating the machine. The machine is also provided with an error key 552, a sub-total key 553, and a grand-total key 554.

The record 60 is carried on a suitable platen (not shown), which is in turn carried on a shaft 555 which may be advanced by hand by means of the knob 556. In ordinary operation, the platen is advanced one space between entries in the usual and well known manner, the carriage 557 being provided with suitable mechanism associated with the internal mechanism of the machine for producing such effect.

A rod 558 may carry a serrated member 559 for convenience in detaching the record at the completion of the series of item entries and designations.

Figure 34:
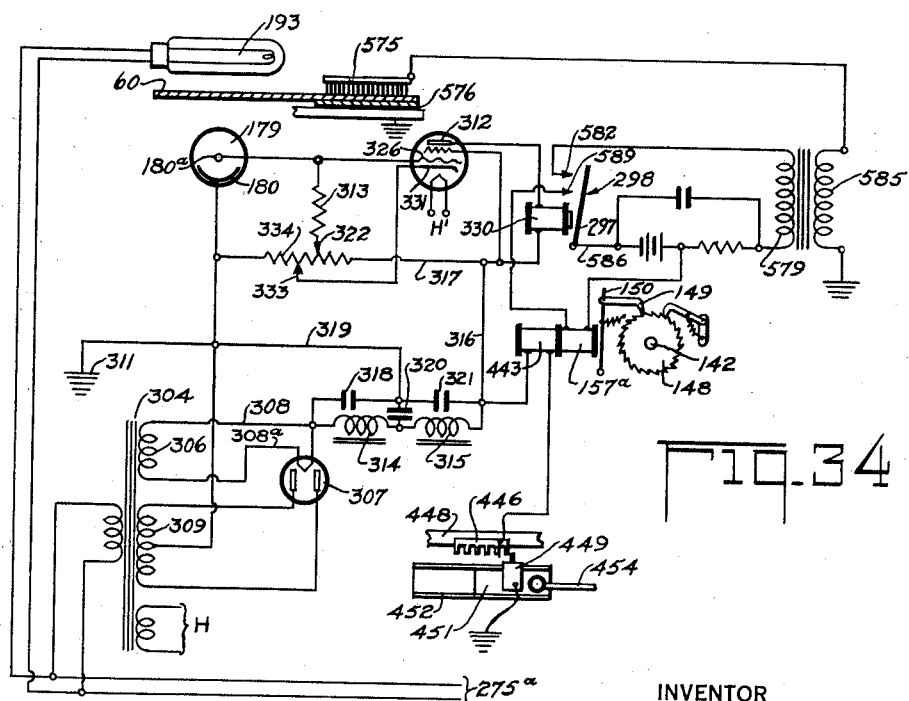

A further modification contemplates the utilization of the "Lichtenberg" effect for recording the items of the wanted classifications on the film 117, instead of using the mercury flash lamp 205 for that purpose. In this new embodiment the photo-cell 179 would, through the medium of electronic circuits similar to those in Figure 17, control a relay, and this relay in turn would control the high tension induction coil, thereby providing a source of high tension current or oscillations. In such an arrangement, the circuit diagram shown in Figure 17 would necessarily be modified and the resultant circuit would be such as that illustrated in Figure 34. The area of the record 60 containing the classification representations is illuminated by the lamp 193 and the area of the record containing the item entries and/or the special representations, shown in Figure 10 and above referred to, are subjected to the influence of the high tension current through the medium of a brush 575.

The photoelectric cell 179 is positioned beneath the record 60 to receive light via the apertures in the settable slides and is adapted to be deprived of said light when classification representations cut off the light, thereby preventing the light from reaching the cell, or substantially reducing the amount of light passing to the cell. The other elements and their connections are similar to those already described in connection with flash tubes and also in connection with high tension coils, therefore, Figure 34 need not be described in detail.

Figure 33:
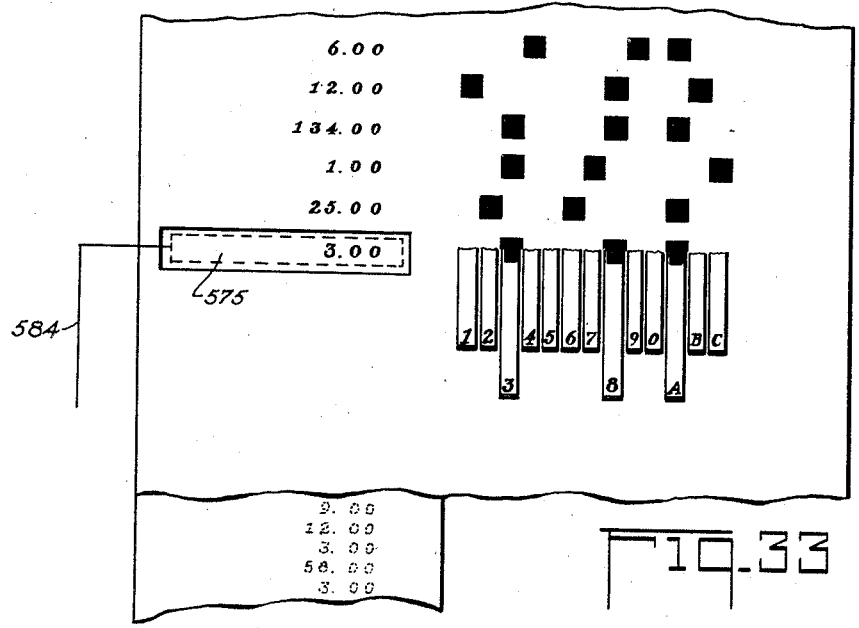
Figures 33 and 34 shows a further modification utilizing the combined features of the first two embodiments shown.

The electronic circuit is so balanced that as long as any light reaches the cell 179 from the lamp 193 via the record, no current will flow in the plate circuit—that is to say, via the coil 330. As soon as representations block the openings in the slides which have been set, for example the slides 38A as shown in Figure 33, and prevent light from reaching the cell 179, a plate current flows in the plate circuit of the tube 312, and by energizing the magnet 330 with the resultant attraction of the armature 297, this causes the armature to contact the contact points 582 and 589, thereby energizing the primary winding 579 of the coil or transformer 580 and the energization of the coil or winding 157ᵃ respectively. This causes a high tension current to be induced in the secondary 585, and the brush 575 which is connected to said secondary, influences a definite area of the record 60 of the treated or sensitized strip 576. As stated before, the item entries may be made with an ink or other composition of matter which includes conductive material, for example, a metallic salt.

In Figure 33, the item of $3.00 in the Class 38A is in line with the window 169, and the area influenced by the brush is shown in dotted lines in Figure 33. It so happens that this area is substantially equal to the back of the brush 575.

Since the item entry contains metallic or conductive material, the high tension current from the brush 575 will affect the treated or sensitized strip 576 under the entire area of the brush with the exception of the area covered by the figures themselves, with the result that images of these figures in relief are recorded on the strip 576; and, as before pointed out, this sensitized strip may receive visible images due to the electrolytic action of the current upon the emulsion. This emulsion may include salts of the halogen group—for example, iodide, chloride, bromide, etc. If the treated strip is stored in humidors and kept in the humid state up to the time it is subjected to the electrolytic action of the high tension current, the images of the items will be directly recorded thereon in relief, without the necessity of having to run the strip through a developing process thereafter. Such images in relief would have an appearance similar to the figures shown in Figure 24.

By the term "light" in the appended claims, is meant the spectrum including not only the visible zone of light, but the zones both above and below the visible zones.

Although the invention has been disclosed and specific details of embodiments thereof capable of carrying out the new and improved method, it must be understood that such details are not intended to be limitative of the invention except in so far as set forth in the following claims.

What is claimed is:

1. In an accounting machine, a record comprised of item entries in one field and representations in various positions in a second field indicating the classification of said item entries, means for moving said record through said machine, a sensing means for said record, a sensitized film positioned beneath the record and in contact therewith, a step-by-step mechanism for feeding said film, a flash lamp and circuits for controlling the same under control of the sensing means whereby rays from said lamp may impinge upon said record and thereby transfer images of items thereon to said film, and control means to effect the feeding of the film after each transfer of an image.

2. In a record controlled machine, a record comprised of item entries in one field and code impedance elements in another field and indicating the classification of said item entries, mechanism for continuously moving said record through said machine, a source of illumination for scanning said record, a photoelectric cell positioned to receive light from said source, a barrier positioned between said source of illumination and said cell and having a series of perforations formed therein through which light from said source may normally pass to said cell, a series of slides normally closing said perforations, one slide being provided for each perforation, said record being positioned between said source and said photoelectric cell and adjacent to said barrier, said slides constituting settable means for preselecting the positions of said impedance elements representing a desired classification so that when the field carrying the desired classification traverses said settable means, light from said source tending to pass said cell is impeded, and recording means under control of said photoelectric cell when the light passing thereto from said source is impeded.

3. In a record controlled machine, a record comprised of item entries in one field and code impedance elements in another field paralleling said entries and indicating the classification of said item entries, mechanism for continuously moving said record through said machine, a sensing means, a sensitized strip and means supporting the same in contact with the undersurface of the field of said record carrying the item entries, mechanism under control of said record for advancing said strip in steps, a high speed flash lamp positioned above said portion of the record carrying item entries, a mask spanning said last field having an opening through which light from said flash lamp may illuminate only one item entry at a time, and means under control of the record at said sensing means for causing said flash lamp to flash, thereby photographically recording upon said strip a replica of the item entry designated by the control patterns in control at said sensing means.

4. In a record controlled machine, a record comprised of item entries in one field and code impedance elements in another field paralleling said entries and indicating the classification of said item entries, mechanism for continuously moving said record through said machine, a constant source of illumination adjacent to and above said second field of the record, a photoelectric cell positioned beneath said second field of the record, a wall between said source and said cell, a longitudinal slot formed in said wall with its longitudinal axis at right angle to the longitudinal axis of said record, a plurality of movable members each having an aperture formed therein, said members constituting slides and having their longitudinal axes at right angles to the axis of said slot, a plurality of supports carried in said wall, said supports being positioned between said movable members and including slots engaging said members to permit them to be settably moved to either of two positions relative to said longitudinal slot, one of said positions being the normal position in which a solid portion of a member is in line with said longitudinal slot and the other position being the settable position in which the aperture is in line with the slot, whereby any of said slides may be set in accordance with the code of the impedance elements to be selected for control, said elements being adapted to impede the light tending to pass to said cell from said source, and recording means under control of said photoelectric cell when the light passing thereto from said source is impeded.

5. In a record controlled machine, a record comprised of a medium carrying recorded items together with groups of coded representations, the representations in each group being positioned relative to each other in accordance with the classification of the item with which it corresponds, means for moving said medium between a steady source of light and photoelectric means, means having a gate formed therein, for supporting said medium between said source and said photoelectric means, said supporting means carrying a plurality of parallel slidable members spanning said gate, each member having an aperture formed therein, said members being normally positioned with solid portions thereof spanning said gate and adapted to be set with their apertures in line with said gate whereby light may normally pass from said source via said medium to said photoelectric means until impeded by the group of representations corresponding to the setup, and recording means under control of said photoelectric means.

6. In an accounting machine, a record strip carrying a plurality of series of control patterns representing classifications, a combined sensing and recording stage, a film carrying perforations, a constant source of light arranged to shine through and scan the record through the perforations adjacent to the edges of said film, the passage of light through said perforations being adapted to be blocked by some of said patterns, photoelectric means normally adapted to receive light passing through said perforations, a plurality of flash lamps associated with said photoelectric means, one flash lamp being provided for each row of perforations in said film and adapted to illuminate its row of perforations with the exception of the end perforations adjacent to said edges, said record when illuminated by light passing thereto from said flash lamps via said perforations being adapted to reflect light to the under side of said film when control patterns appear beneath perforations, and filter means interposed between said flash lamps and said perforations of such color as to enhance the reflection of light from said patterns to the under side of said film, said record being of such color that it absorbs light falling on areas therein where no patterns appear whereby when said record is run through the machine indications are recorded on the under side of said film from which the number of classifications in the record may be determined.

7. In a record controlled machine, a record strip carrying item entries in one field and representations in another field, said representations indicating classifications of said item entries, a sensing stage in said machine, said sensing stage including a light barrier with a steady source of light on one side thereof, means for moving said strip across said barrier, light responsive means on the opposite side of said barrier, settable means to form a light path through said barrier and comprised of a plurality of aligned grooved strips spaced apart from each other, a longitudinal slot formed in said barrier and spanning all of the spaces between said strips, slidable members mounted in the grooves in said strips and each having an aperture therein normally positioned over a solid portion of said barrier and adapted to be set to a position with its aperture in alignment with said slot, permitting light to pass therethrough to said light responsive meas, whereby a classification representation on said strip corresponding to a wanted classification may interrupt the light passing to said light responsive means, and mechanism controlled by said light responsive means.

8. In a record controlled machine, a record strip carrying item entries in one field and representations in another field, said representations indicating classifications of said item entries, a light barrier, means for moving said strip across light barrier, a source of light adjacent to the surface of said barrier across which said strip is moved, light responsive means on the opposite side of said barrier, a plurality of aligned grooved strips mounted in said barrier in spaced relation to each other, a longitudinal slot formed in said barrier spanning all of the spaces between said strips, slidable members mounted in the grooves in said strips and each having an aperture formed therein, said slidable members being normally positioned with solid portions covering the portions of said longitudinal slot adjacent thereto and adapted to be set with its aperture in line with said longitudinal slot, said slidable members forming settable means for permitting light to pass therethrough from said source to said light responsive means whereby said classification representations in the record passing over the set apertures may change the impedance of light passing through said apertures to said light responsive means, and mechanism controlled by said light responsive means when representations corresponding to the classification to which said settable means is set impedes said light from passing to said light responsive means.

9. In a record controlled machine, a record strip carrying item entries in one field and impedance means in a second field representing classifications of said item entries, a sensing stage in said machine, means for moving said strip across said stage, a longitudinal slot formed in said stage within a predetermined area, means having apertures settable within said predetermined area in said stage and comprised of a plurality of slidable members mounted in said stage, each of said members carrying an aperture which is normally closed off by a solid portion of said stage and which is adapted to be set with its aperture co-operating with said longitudinal slot, a source of light positioned on one side of said stage, light responsive means positioned on the opposite side of said stage, whereby said light, said apertures and said responsive means are in alignment, and means under control of said light responsive means when said impedance elements of a wanted classification interrupt the light passing through said set apertures for controlling the operation of an intermittent source of light.

10. In a record controlled machine, a source of light, light responsive means spaced apart therefrom, barrier means between said source and said light responsive means, a longitudinal slot formed in said barrier with its longitudinal axis at right angles to the axis of the record, said barrier means having mounted thereon a plurality of parallel slidable and settable members, each of said members having an aperture formed therein which is normally positioned over and blocked by a solid portion of said barrier means and adapted to be individually set with its aperture in alignment with said slot to form paths permitting light from said source to impinge upon said light responsive means, a record strip carrying item entries in one field and impedance elements in a second field representing classifications of said item entries, said impedance means being adapted to prevent said light from impinging upon said light responsive means when a predetermined arrangement of impedance elements encounters a given setting of apertures, means for moving said strip across said stage, and mechanism controlled by said light responsive means when the latter is deprived of light.

11. In a record controlled machine, a light-tight casing having a wall therein dividing said casing into two compartments, a longitudinal opening formed in said wall, a plurality of slidable members spanning said longitudinal opening, each of said members having formed therein an aperture through which light may pass whereby said slidable members may be individually set in advanced positions with their apertures in line with said opening, a source of light in one of said compartments, light responsive means in the other of said compartments, a record strip including item entries in one field and classifications representations positioned in definite relation relative to said entries in another field, said representations being adapted to form light impedance elements, means for moving said record strip along a path adjacent to said wall whereby representations of a predetermined pattern in accordance with the setting of said slidable members may prevent light from passing through said apertures to said light responsive means, and mechanism controlled by said light responsive means when the latter is deprived of light.

12. In a record controlled machine, a record including item entries in one field and representations indicating the classification of said entries in another field, a flash lamp and instrumentalities for controlling the same and causing rays from the same to impinge upon a definite area of said record in said first field including a sensing means responsive to a class of representations, and a sensitized film beneath and in contact with said record and adapted to receive rays from said lamp through said record, whereby images of said item entries corresponding to said representations of the class to which said sensing means is responsive when said representations are in control at the sensing means, are recorded upon said film, means for moving said record through the machine at a constant rate and means for advancing said film in steps between the recordings.

13. In a record controlled machine employing records comprised of item entries and representations in various positions indicating the classification of said item entries, a sensing means including a source of light, photoelectric means spaced apart from said light, a plurality of slidable members each having an aperture formed therein, said members being positioned between said light and said photoelectric means and having their apertures normally covered and adapted to be uncovered when moved to an advanced position whereby a representation in the record traversing the advanced members may control the light passing from said source to said photoelectric means, and means for moving said record along a path across said members.

14. In a record controlled machine, a casing, a wall within said casing dividing the same into two compartments, a cross wall within one of said compartments angular with respect to said first wall, a constant source of light in one of said compartments, photoelectric means in the other of said compartments, a longitudinal opening formed in the wall between said compartments, and a plurality of settable members spanning said opening and normally assisting in forming a light barrier between said compartments, apertures in said members normally positioned beneath said cross wall to assure that no light may pass through said longitudinal opening and adapted to be advanced in line with said opening when a member is set, and thereby permitting light from said source to impinge upon said photoelectric means, a record strip including impedance elements representing classifications and adapted to prevent said light from impinging upon said photoelectric means when a predetermined arrangement of impedance elements encounters a given set of apertures, means for moving said strip across said opening, and mechanism controlled by said photoelectric means when the latter is deprived of light.

15. The invention according to claim 14 in which said settable members extend through said cross wall, and the extensions of said members bear indications, means for covering said indications when said slides are in their normal positions but ineffective to cover said indications when said members are advanced, and means for making a photographic record of the uncovered indications, thereby making a permanent record of the setup.

CHARLES J. GOODALE.